(12) United States Patent
Takami

(10) Patent No.: US 12,287,309 B2
(45) Date of Patent: Apr. 29, 2025

(54) WIRE ROPE INSPECTION DEVICE AND WIRE ROPE INSPECTION SYSTEM

(71) Applicant: Shimadzu Corporation, Kyoto (JP)

(72) Inventor: Yoshio Takami, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 223 days.

(21) Appl. No.: 18/019,708

(22) PCT Filed: Mar. 12, 2021

(86) PCT No.: PCT/JP2021/009980
§ 371 (c)(1),
(2) Date: Feb. 3, 2023

(87) PCT Pub. No.: WO2022/054315
PCT Pub. Date: Mar. 17, 2022

(65) Prior Publication Data
US 2023/0273155 A1     Aug. 31, 2023

(30) Foreign Application Priority Data

Sep. 10, 2020  (JP) ................................. 2020-152289

(51) Int. Cl.
*G01N 27/83* (2006.01)
*B66B 7/12* (2006.01)

(52) U.S. Cl.
CPC .............. *G01N 27/83* (2013.01); *B66B 7/123* (2013.01)

(58) Field of Classification Search
CPC ......... G01N 27/83; G01N 27/82; B66B 7/123

USPC .......................................................... 324/228
See application file for complete search history.

(56) References Cited

U.S. PATENT DOCUMENTS

| 8,558,541 B2 * | 10/2013 | Furukawa | B65G 43/02 324/207.16 |
| 8,575,921 B1 * | 11/2013 | Sloan | G01B 7/003 324/228 |
| 8,653,811 B2 * | 2/2014 | Simek | G01N 27/87 324/228 |

(Continued)

FOREIGN PATENT DOCUMENTS

| JP | H05-149926 A | 6/1993 |
| WO | 2019/171667 A1 | 9/2019 |

OTHER PUBLICATIONS

Translation of JP,05-149926. Inventor Toshiaki. (Year: 1993).*

(Continued)

*Primary Examiner* — Christopher P McAndrew
(74) *Attorney, Agent, or Firm* — Muir Patent Law, PLLC

(57) ABSTRACT

A wire rope inspection device (100) is provided with a first detection coil (30) and a second detection coil (40), and a processing unit (61). The second detection coil is arranged to be inclined to the first detection coil when viewed from a direction (X-direction) perpendicular to a first direction (Z-direction) along which the first detection coil moves relative to the wire rope (W). The processing unit identifies an abnormality position of the wire rope in the first direction based on a detection signal detected by the first detection coil and identifies an area of the abnormality position of the wire rope in a cross-section based on a detection signal detected by the second detection coil.

16 Claims, 10 Drawing Sheets

(56) References Cited

U.S. PATENT DOCUMENTS

| | | | |
|---|---|---|---|
| 11,668,773 B2* | 6/2023 | DeBiccari | G01N 27/87 |
| | | | 324/228 |
| 2014/0159711 A1* | 6/2014 | Tsai | G01R 15/148 |
| | | | 324/228 |
| 2016/0041209 A1* | 2/2016 | Tsujimoto | H10N 50/10 |
| | | | 324/228 |
| 2016/0131788 A1* | 5/2016 | Kopp | G01P 13/00 |
| | | | 324/228 |
| 2021/0107770 A1 | 4/2021 | Iijima | |

OTHER PUBLICATIONS

Extended European Search Report (EESR) dated Aug. 22, 2024 for the corresponding European patent application No. 21866277.3.
Written Opinion by the International Searching Authority for PCT application No. PCT/JP2021/009980, dated May 11, 2021.

* cited by examiner

WIRE ROPE INSPECTION DEVICE AND WIRE ROPE INSPECTION SYSTEM

TECHNICAL FIELD

The present invention relates to a wire rope inspection device and a wire rope inspection system. More specifically, the present invention relates to a wire rope inspection device and a wire rope inspection system equipped with a detection coil for detecting the magnetic flux of a wire rope.

BACKGROUND OF THE INVENTION

Conventionally, a wire rope inspection device for detecting a change in the magnetic flux of a wire rope by a detection coil has been known. Such a wire rope inspection device is disclosed in WO 2019/171667.

WO 2019/171667 discloses a wire rope inspection device (magnetic body inspection device) provided with an excitation unit provided to a wire rope (magnetic body) and a detection coil for detecting the magnetic flux (magnetic field) of the wire rope. The wire rope inspection device described in the above-described WO 2019/171667 is configured as follows. That is, while moving the detection coil relative to the wire rope, the change in the magnetic flux of the wire rope caused by application of magnetic flux is detected by the detection coil. With this, the detection coil identifies the damaged position (abnormality position) of the wire rope in a direction along which the detection coil moves relative to the wire rope.

PRIOR ART DOCUMENT

Patent Document

Patent Document 1: WO 2019/171667

SUMMARY OF THE INVENTION

Problems to be Solved by the Invention

In the wire rope inspection device described in WO2019/171667 described above, it is possible to identify the damaged position (abnormality position) of the wire rope in a direction along which the detection coil moves relative to the wire rope. However, it is not possible to identify the damaged position within the cross-section of the wire rope. In other words, in the cross-section of the wire rope, it is not possible to determine the area where the abnormality is present on which of the inner side and the outer side in the cross-section of the wire rope. Therefore, although not explicitly described in WO 2019/171667 described above, conventionally, it is required to visually confirm whether the abnormality is present on the inner side of the wire rope or on the outer side thereof. Wire rope inspection is often performed in a non-illuminated dark area. For example, the abnormality of the wire disconnection is a very fine abnormality of a wire diameter $\Phi$ of 1 mm or less and a disconnection width of 1 mm or less. Therefore, it is very useful to determine in a wire rope inspection practice in advance whether the abnormality has occurred on the inner side of the wire rope or on the outer side thereof. In other words, it is very useful to determine the abnormality area in the cross-section of the wire rope in advance. Therefore, it has been desired to identify the abnormality area of the wire rope in the cross-section thereof, in addition to the abnormality position of the wire rope in a direction along which the detection coil moves relative to the wire rope.

The present invention has been made to solve the above-described problems. It is an object of the present invention to provide a wire rope inspection device and a wire rope inspection system capable of identifying an abnormality area of a wire rope in a cross-section thereof, in addition to an abnormality position of the wire rope in a direction along which a detection coil moves relative to the wire rope.

Means for Solving the Problem

In order to attain the above-described objects, the wire rope inspection device according to a first aspect of the present invention is provided with:

a plurality of detection coils each configured to move relative to a wire rope in a direction along which the wire rope extends and detect magnetic flux of the wire rope; and a processing unit configured to acquire and process detection signals detected by the plurality of detection coils, wherein the plurality of detection coils includes a first detection coil and a second detection coil, the first detection coil being provided along a circumference direction of the wire rope, the second detection coil being provided along the circumference direction of the wire rope and arranged to be inclined to the first detection coil when viewed from a direction perpendicular to a first direction along which the first detection coil moves relative to the wire rope, and wherein the processing unit is configured to identify an abnormality position of the wire rope in the first direction based on a detection signal detected by the first detection coil and identify an area of the abnormality position of the wire rope in a cross-section of the identified abnormality position of the wire rope in the first direction, based on a detection signal detected by the second detection coil.

A wire rope inspection device according to a second aspect of the present invention is provided with:

a wire rope inspection device provided with a plurality of detection coils, the plurality of detection coils each being configured to move relative to the wire rope in a direction along which the wire rope extends and detect magnetic flux of the wire rope; and a processing device configured to acquire and process detection signals detected by the plurality of detection coils, wherein the plurality of detection coils includes a first detection coil and a second detection coil, the first detection coil being provided along a circumference direction of the wire rope, the second detection coil being provided along the circumference direction of the wire rope and arranged to be inclined to the first detection coil when viewed from a direction perpendicular to a first direction along which the first detection coil moves relative to the wire rope, and wherein the processing device is configured to identify an abnormality position of the wire rope in the first direction, based on the detection signal detected by the first detection coil, and identify an area of the abnormality position of the wire rope in a cross-section of the acquired abnormality position of the wire rope in the first direction, based on a detection signal detected by the second detection coil.

Effects of the Invention

In the wire rope inspection device according to the first aspect of the present invention and the wire rope inspection system according to the second aspect of the present invention, as described above, the device and the system include a first detection coil and a second detection coil. In the first detection coil, a plurality of detection coils is provided along the circumferential direction of the wire rope. The second detection coil is provided along the circumferential direction of the wire rope and arranged to be inclined to the first detection coil when viewed in a direction perpendicular to a first direction along which the first detection coil moves relative to the wire rope. Here, the second detection coil is arranged to be inclined to the first detection coil when viewed from the direction perpendicular to the first direction. Therefore, the time at which the first detection coil and the second detection coil each pass the abnormality area in the cross-section of the wire rope differs depending on the position in the cross-section of the abnormality area of the wire rope. With this, the abnormal detection signal detected by the first detection coil and the abnormal detection signal detected by the second detection coil are detected at different times depending on the position in the cross-section of the abnormality area in the cross-section of the wire rope. The geometric inclination arrangement of the second detection coil is known in advance. Therefore, the abnormality area in the cross-section of the wire rope can be identified based on the deviation of the detection time between the abnormal detection signal detected by the first detection coil and the abnormal detection signal detected by the second detection coil. Consequently, it is possible to provide a wire rope inspection device and a wire rope inspection system capable of identifying an abnormality area of a wire rope in a cross-section thereof, in addition to an abnormality position of the wire rope in a direction along which the detection coil moves relative to the wire rope.

EMBODIMENTS FOR CARRYING OUT THE INVENTION

Hereinafter, some embodiments in which the present invention is embodied will be described with reference to the attached drawings.

First Embodiment

A configuration of a wire rope inspection system 300 according to a first embodiment will be described with reference to FIG. 1 to FIG. 15. In the following description, the term "perpendicular" denotes intersecting at an angle of 90° or nearly 90°.

(Configuration of Wire Rope Inspection System)

Figure 1:
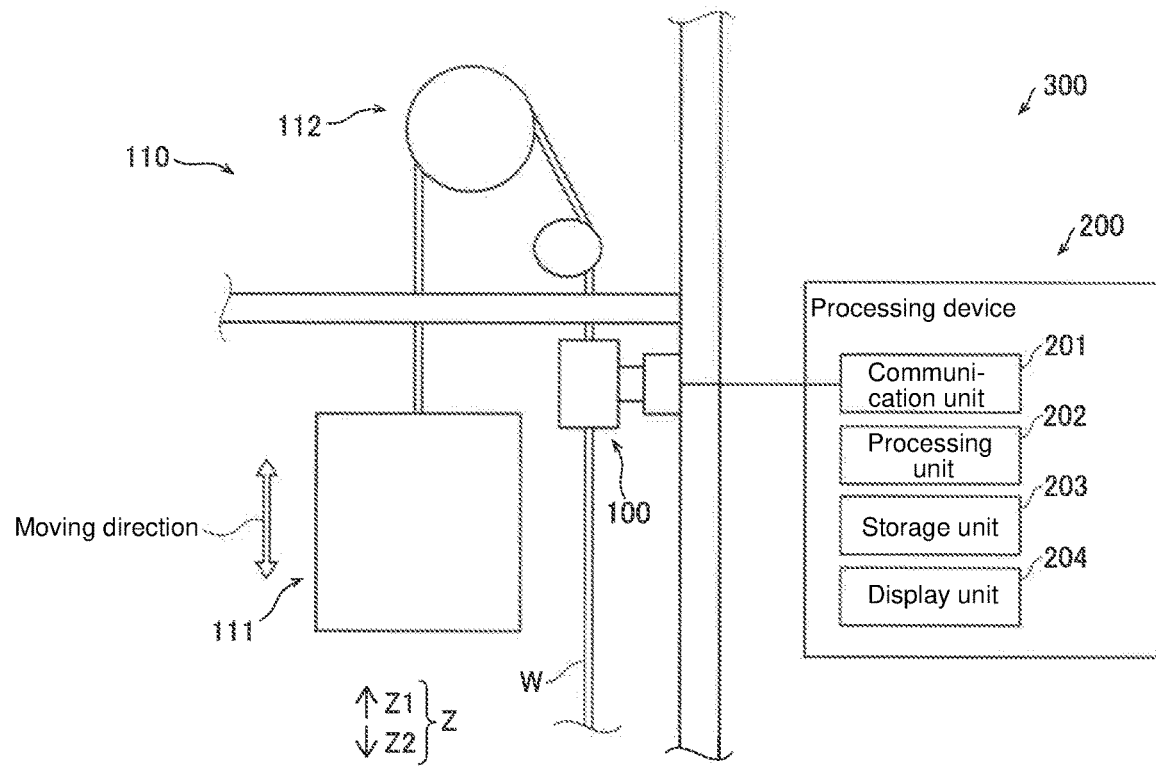
FIG. 1 is a diagram showing an elevator provided with a wire rope inspection device according to a first embodiment.

As shown in FIG. 1, the wire rope inspection system 300 is a system for inspecting an abnormality (such as a wire disconnection) of a wire rope W as an inspection target made of a magnetic body. The wire rope inspection system 300 is provided with a wire rope inspection device 100 for measuring the magnetic flux of the wire rope W and a processing device 200. The processing device 200 performs a display of the measurement result of the magnetic flux of the wire rope W by the wire rope inspection device 100 and an analysis based on the measurement result of the magnetic flux of the wire rope W by the wire rope inspection device 100. By inspecting the abnormality of the wire rope W with the wire rope inspection system 300, it is possible to confirm the abnormality of the wire rope W that is hard to confirm visually.

FIG. 1 shows an example in which the wire rope inspection device 100 inspects the wire rope W used to move a cage 111 of the elevator 110. The elevator 110 is provided with the cage 111 and a winding machine 112 for driving the wire rope W. The elevator 110 is configured to move the cage 111 in a vertical direction (in the Z-direction) by moving the wire rope W with the winding machine 112. The wire rope inspection device 100 inspects the damage of the wire rope W moved by the winding machine 112 in a state of being fixed so as not to move with respect to the wire rope W.

The wire rope W is arranged so as to extend in the Z-direction at the position of the wire rope inspection device 100. The wire rope inspection device 100 measures the magnetic flux of the wire rope W while moving relative to the wire rope W in the Z-direction. In a case where the wire rope W itself moves like the wire rope W used for the elevator 110, the measurement of the magnetic flux of the wire rope W by the wire rope inspection device 100 is performed while moving the wire rope W in the Z-direction. With this, the magnetic flux of the wire rope W at each position of the wire rope W in the Z-direction can be measured, and therefore, the damage of the wire rope W at each position of the wire rope W in the Z-direction can be inspected.

(Configuration of Processing Device)

The processing device 200 (see FIG. 1) is configured by, for example, a personal computer. The processing device 200 is arranged in a space different from the space in which the wire rope inspection device 100 is arranged. As shown in FIG. 1, the processing device 200 is provided with a communication unit 201, a processing unit 202, a storage unit 203, and a display unit 204. The communication unit 201 is a communication interface to communicably connect the wire rope inspection device 100 and the processing device 200. The processing device 200 receives the measurement result (measurement data) of the wire rope W by the wire rope inspection device 100 via the communication unit 201. The processing unit 202 controls each part of the processing device 200. The processing unit 202 includes a processor, such as, e.g., a CPU, a memory, etc. The processing unit 202 analyzes the damage of the wire rope W, such as, e.g., the wire disconnection, based on the measurement result of the wire rope W received via the communication unit 201. The storage unit 203 is a storage medium, such as, e.g., a flash memory, and memorizes (stores) the information, such as, e.g., the analysis result of the measurement result of the wire rope W by the processing unit 202. The display unit 204 is configured by, for example, a liquid crystal monitor to display the information, such as, e.g., the measurement result of the wire rope W and the analysis result of the measurement result of the wire rope W by the processing unit 202.

(Configuration of Wire Rope Inspection Device)

Figure 2:
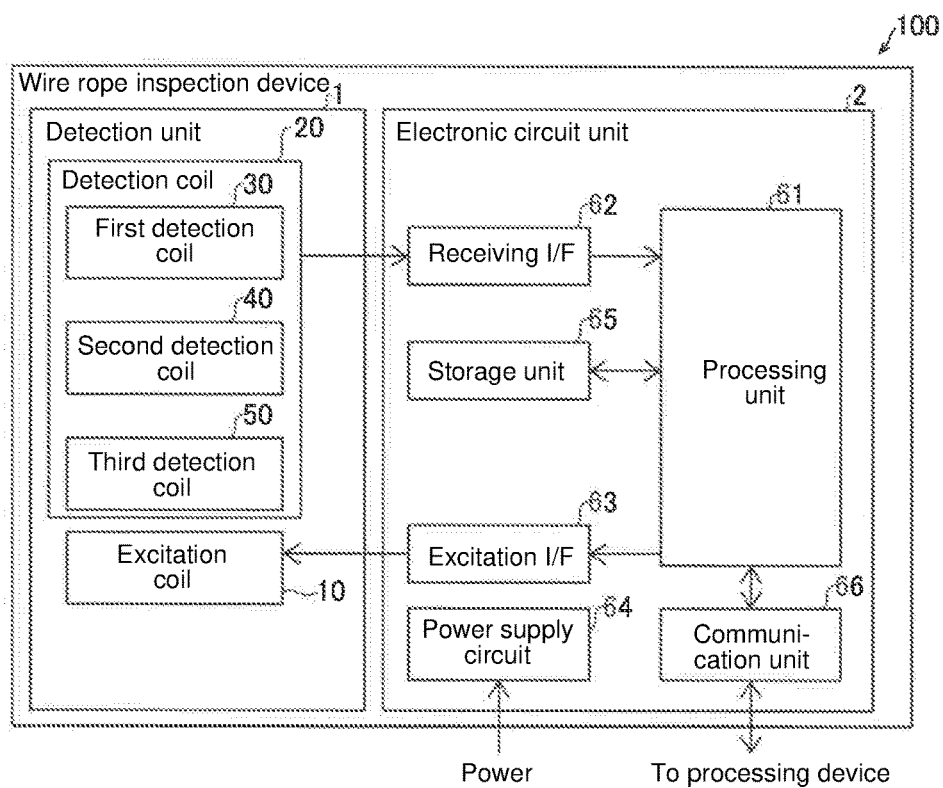
FIG. 2 is a block diagram showing a configuration of the wire rope inspection device according to the first embodiment.

As shown in FIG. 2, the wire rope inspection device 100 is provided with a detection unit 1 and an electronic circuit unit 2. The detection unit 1 detects (measures) the magnetic flux of the wire rope W. Specifically, the detection unit 1 includes an excitation coil 10 and detection coils 20. The excitation coil 10 is configured to move relative to the wire rope W and apply magnetic flux to the wire rope W. The excitation coil 10 generates a magnetic field along the Z-direction inside (inside a ring) due to the flow of the alternating excitation current and applies the generated magnetic field to the wire rope W arranged inside. Note that the excitation coil 10 is an example of the "excitation unit" recited in claims.

The detection coils 20 move relative to the wire rope W and detect (measure) the magnetic flux of the wire rope W to which a magnetic field is applied by the excitation coil 10. The detection coils 20 each transmit a detection signal (differential signal) corresponding to the detected magnetic flux of the wire rope W. The detection coils 20 include a first detection coil 30, a second detection coil 40, and a third detection coil 50. The detail of the detection coil 20 will be described later.

Note that the first detection coil 30, the second detection coil 40, and the third detection coil 50 are an example of the "plurality of detection coils" recited in claims.

The electronic circuit unit 2 includes a processing unit 61, a receiving I/F (interface) 62, an excitation I/F 63, a power supply circuit 64, a storage unit 65, and a communication unit 66. The processing unit 61 is configured to control each part of the wire rope inspection device 100. The processing unit 61 includes a processor, such as, e.g., a CPU (Central Processing Unit), a memory, an AD converter, etc. The receiving I/F 62 receives (acquires) the detection signal (differential signal) of the detection coil 20 and transmits it to the processing unit 61. The receiving I/F 62 includes an amplifier. The receiving I/F 62 amplifies the detection signal of the detection coil 20 by the amplifier and transmits it to the processing unit 61. The excitation I/F 63 receives a control signal from the processing unit 61. The excitation I/F 63 controls the power supply to the excitation coil 10 based on the received control signal. The power supply circuit 64 receives power from the outside and supplies the power to each part of the wire rope inspection device 100, such as, e.g., the excitation coil 10. The storage unit 65 is a storage medium including, for example, a flash memory, and memorizes (stores) the information, such as, e.g., the measurement result (measurement data) of the wire rope W. The communication unit 66 is a communication interface and communicably connects the wire rope inspection device 100 and the processing device 200.

Figure 3:
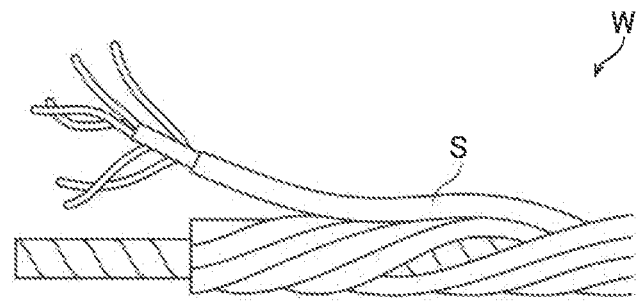
FIG. 3 is a side view showing a configuration of a wire rope.
Figure 4:
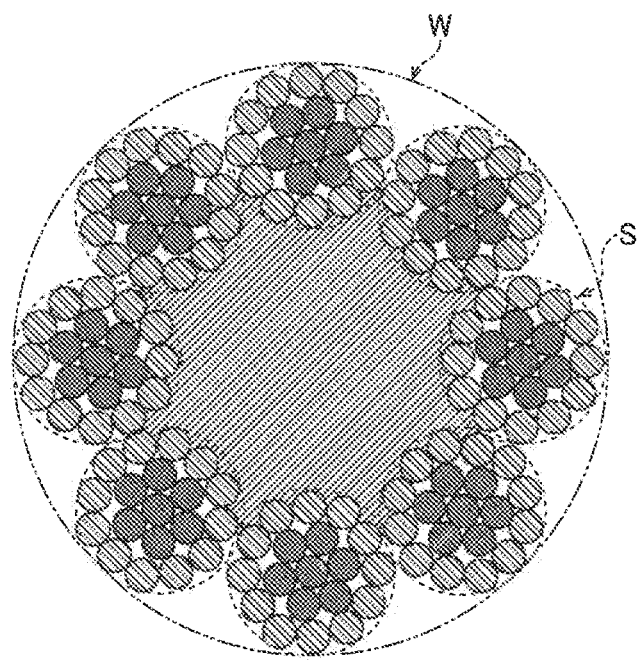
FIG. 4 is a cross-sectional view showing a configuration of a wire rope.

Further, as shown in FIG. 3 and FIG. 4, the wire rope W is formed by twisting a plurality of strands S, which are wire materials having magnetism, and is a magnetic body made of an elongated member extending along the Z-direction. Note that the strand S is configured by twisting a plurality of wires. The wire rope W is inspected in the state (presence or absence of damage or the like) by the wire rope inspection device 100 in order to prevent wire disconnection due to deterioration. A wire rope W determined that the degree of degradation has exceeded the specified criteria as a result of the magnetic flux measurement of the wire rope W shall be replaced by the operator.

(Configuration of Excitation Coil)

Figure 5:
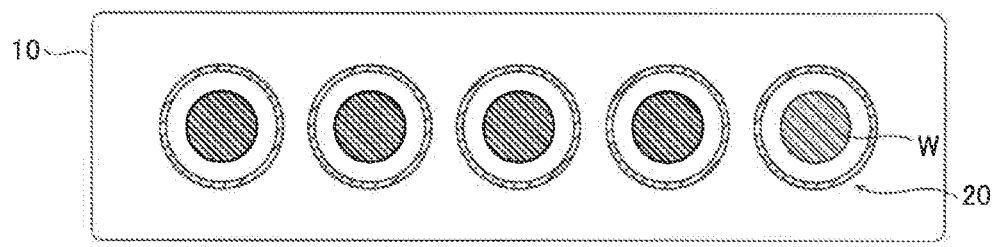
FIG. 5 is a cross-sectional view of a wire rope inspection device according to the first embodiment.

As shown in FIG. 5, the elevator 110 (see FIG. 1) is provided with a plurality of wire ropes W. The plurality of wire ropes W is arranged side by side (in parallel to each other) in a direction (X-direction) perpendicular to each longitudinal direction (Z-direction). As shown in FIG. 5, an excitation coil 10 is provided so as to surround the plurality of wire ropes W. The excitation coil 10 is configured to simultaneously excite the magnetization states of the plurality of wire ropes W. Specifically, it is configured such that an excitation alternating current flows through the excitation coil 10 to apply a magnetic field generated based on the excitation alternating current to the plurality of wire ropes W along the Z-direction, in the excitation coil 10.

Each wire rope W passes through the interior (inner side) of the excitation coil 10 and that of the detection coil 20 (the first detection coil 30, the second detection coil 40, and the third detection coil 50). Further, the detection coil 20 is provided inside the excitation coil 10. The detection coil 20 (the first detection coil 30, the second detection coil 40, and the third detection coil 50) is provided to surround the wire rope W when viewed from the Z-direction. The detection coil 20 (the first detection coil 30, the second detection coil 40, and the third detection coil 50) has, for example, an annular shape (circular shape) when viewed from the Z-direction, as shown in FIG. 5. The detection coil 20 may have an oval shape or a track shape when viewed from the Z-direction. The detection coil 20 may have a rectangular shape when viewed from the Z-direction.

Figure 6:
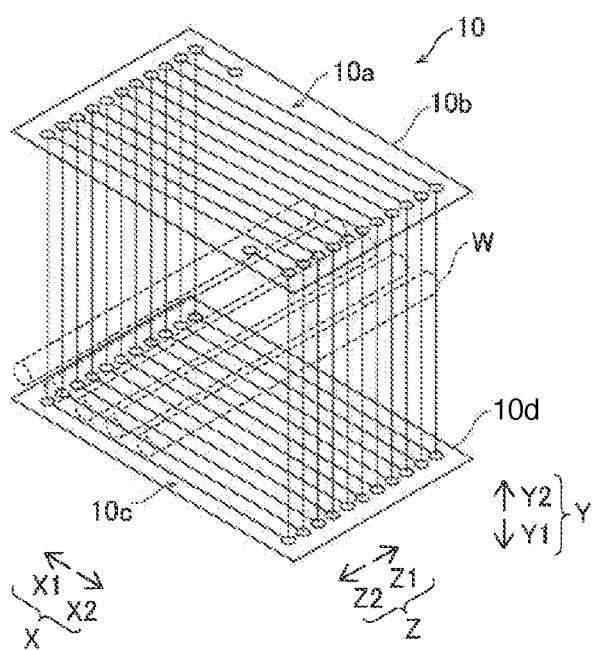
FIG. 6 is a diagram showing a configuration of an excitation coil according to the first embodiment.

As shown in FIG. 6, the excitation coil 10 includes a printed circuit board 10b on which a first conducting wire portion 10a is formed and a printed circuit board 10d on which a second conducting wire portion 10c is formed. The first conducting wire portion 10a and the second conducting wire portion 10c are electrically connected to each other. Note that the arrangement of the excitation coil 10 and that of the detection coil 20 are not limited thereto. Note that the detection coil 20 shown in FIG. 5 and the excitation coil 10 shown in FIGS. 5 and 6 are schematically illustrated, and the arrangement (configuration) thereof may be different from the actual arrangement (configuration).

Figure 7:
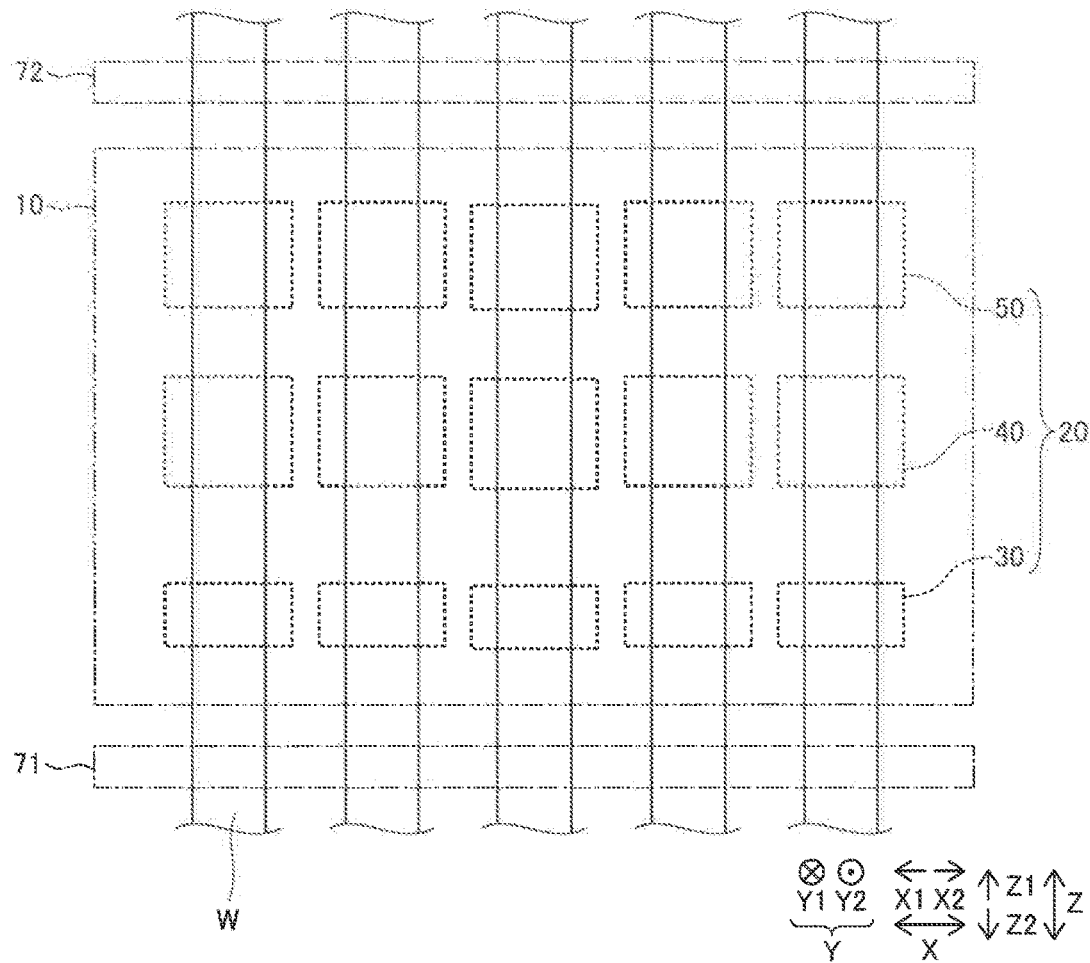
FIG. 7 is a side view of the wire rope inspection device according to the first embodiment.

As shown in FIG. 7, the excitation coil 10 is commonly provided to the plurality of detection coils 20 (the first detection coil 30, the second detection coil 40, and the third detection coil 50).

Further, the wire rope inspection device 100 is provided with magnetic field application units 71 and 72 as shown in FIG. 7. The magnetic field application units 71 and 72 each apply a magnetic field to the wire rope W in advance to adjust the magnitude and the orientation of the magnetic field of the magnetic body of the wire rope W as a magnetic body. The magnetic field application units 71 and 72 are arranged to sandwich the excitation coil 10 and the plurality of detection coils 20 (the first detection coil 30, the second detection coil 40, and the third detection coil 50) in a Z-direction.

(Configuration of Magnetic Field Application Unit)

Figure 8:
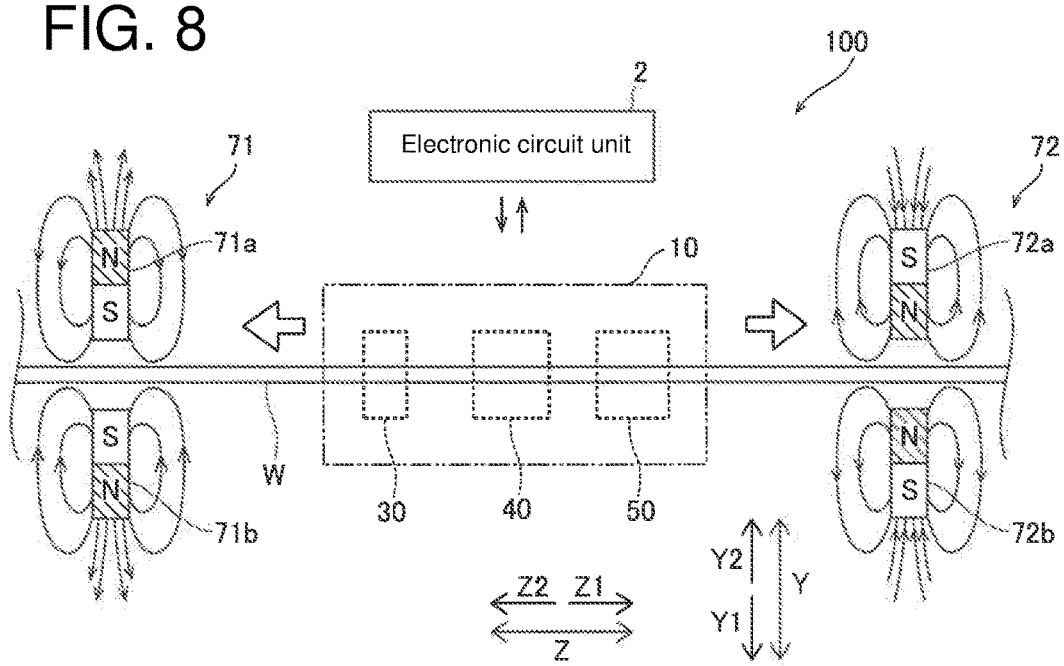
FIG. 8 is a side view showing a configuration of a magnetic field application unit of the wire rope inspection device according to the first embodiment.

As shown in FIG. 8, the magnetic field application units 71 and 72 are each configured to adjust the magnitude and the orientation of the magnetization of the wire rope W as an inspection target by applying a magnetic field to the wire rope W in the Y-direction (a direction intersecting with the X-direction along which the wire rope W extends) in advance. The magnetic field application unit 71 includes magnets 71a and 71b. The magnetic field application unit 72 includes magnets 72a and 72b. The magnetic field application unit 71 (magnets 71a and 71b) is arranged on one side (Z2-direction side) of the direction along which the wire rope W extends, with respect to the detection unit 1 (the excitation coil 10, the first detection coil 30, the second detection coil 40, and the third detection coil 50). The magnetic field application unit 72 (magnets 72a and 72b) is arranged on the other side (Z1-direction side) of the direction along which the wire rope W extends, with respect to the detection unit 1 (the excitation coil 10, the first detection coil 30, the second detection coil 40, and the third detection coil 50). Note that it may be configured such that only one of the magnetic field application units 71 and 72 is provided.

The magnetic field application unit 71 (the magnets 71a and 71b) is configured to apply a magnetic field in a direction parallel to the XY-plane intersecting with the Z-direction and in the Y-direction. The magnetic field application unit 72 (the magnets 72a and 72b) is configured to apply a magnetic field in a direction parallel to the XY-plane intersecting with the Z-direction and in the Y-direction. That is, the magnetic field application units 71 and 72 are each configured to apply a magnetic field in the Y-direction substantially perpendicular to the Z-direction (the longitudinal direction of the elongated member) along which the wire rope W extends.

(Configuration of Detection Coil)

Figure 9:
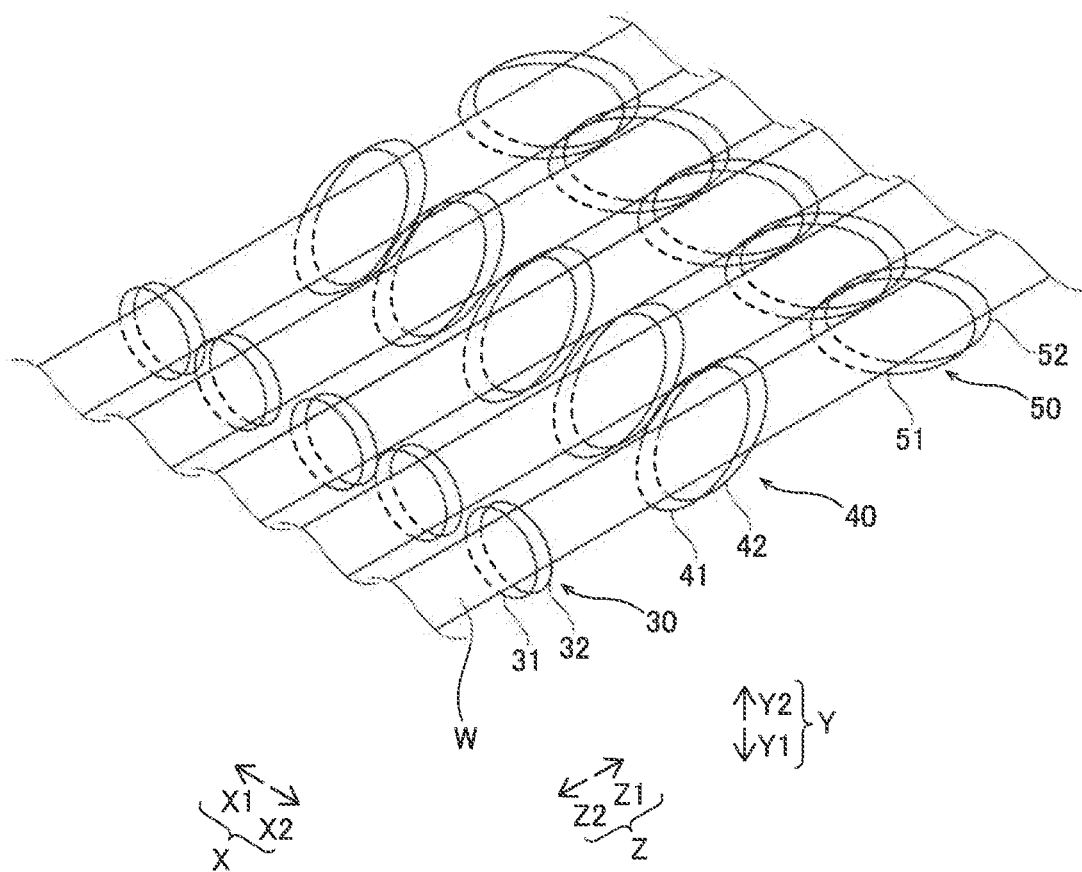
FIG. 9 is a diagram showing an arrangement of detection coils according to the first embodiment.

In the first embodiment, as shown in FIG. 9, the first detection coil 30, the second detection coil 40, and the third detection coil 50 are provided to each of the plurality of wire ropes W.

In the first embodiment, the first detection coil 30, the second detection coil 40, and the third detection coil 50 are configured to move relative to the plurality of wire ropes W and detect the magnetic fluxes of the plurality of wire ropes W.

The first detection coil 30 includes a first receiving coil 31 and a second receiving coil 32. The second receiving coil 32 is differentially connected to the first receiving coil 31 and is arranged on the Z-direction (Z1-direction) side of the first receiving coil 31. The first receiving coil 31 and the second receiving coil 32 are connected in series in such a direction that the winding direction thereof is reversed so that the first receiving coil 31 and the second receiving coil 32 are configured such that currents flow in opposite directions in accordance with the change in the magnetic flux in the Z1-direction.

In the same manner, the second detection coil 40 includes a first receiving coil 41 and a second receiving coil 42. The second receiving coil 42 is differentially connected to the first receiving coil 41 and is arranged on the Z-direction (Z1-direction) side of the first receiving coil 41. The first receiving coil 41 and the second receiving coil 42 are connected in series in such a direction that the winding direction thereof is reversed so that the first receiving coil 41 and the second receiving coil 42 are configured such that currents flow in opposite directions in accordance with the change in the magnetic flux in the Z1-direction.

The third detection coil 50 includes a first receiving coil 51 and a second receiving coil 52. The second receiving coil 52 is differentially connected to the first receiving coil 51 and is arranged on the Z-direction (Z1-direction) side of the first receiving coil 51. The first receiving coil 51 and the second receiving coil 52 are connected in series in such a direction that the winding directions thereof is reversed, and the first receiving coil 51 and the second receiving coil 52 are configured such that currents flow in opposite directions in accordance with the change in the magnetic flux in the Z1-direction.

The first detection coil 30 is provided to output a differential signal of the signal acquired by the first receiving coil 31 and the signal acquired by the second receiving coil 32 as a detection signal. The second detection coil 40 is provided to output a differential signal of the signal acquired by the first receiving coil 41 and the signal acquired by the second receiving coil 42 as a detection signal. In addition, the third detection coil 50 is provided to output a differential signal of the signal acquired by the first receiving coil 51 and the signal acquired by the second receiving coil 52 as a detection signal.

The first detection coil 30, the second detection coil 40, and the third detection coil 50 are arranged at equal intervals in the Z-direction. The detection coils 20 are arranged from the Z2-direction side, in the order of the first detection coil 30, the second detection coil 40, and the third detection coil 50. Further, in the plurality of first detection coils 30, the plurality of second detection coils 40, and the plurality of third detection coils 50 each arranged around each of the plurality of wire ropes W, the adjacent first detection coils 30, the adjacent second detection coils 40, and the adjacent third detection coils 50 are respectively arranged to overlap with each other when viewed from the X-direction. Note that in the plurality of first detection coils 30, the plurality of second detection coils 40, and the plurality of third detection coils 50 each arranged around each of the plurality of wire ropes W, the plurality of first detection coils 30, the plurality of second detection coils 40, and the plurality of third detection coils 50 may be respectively arranged so as to be shifted in the Z-direction when viewed from the X-direction.

Figure 10:
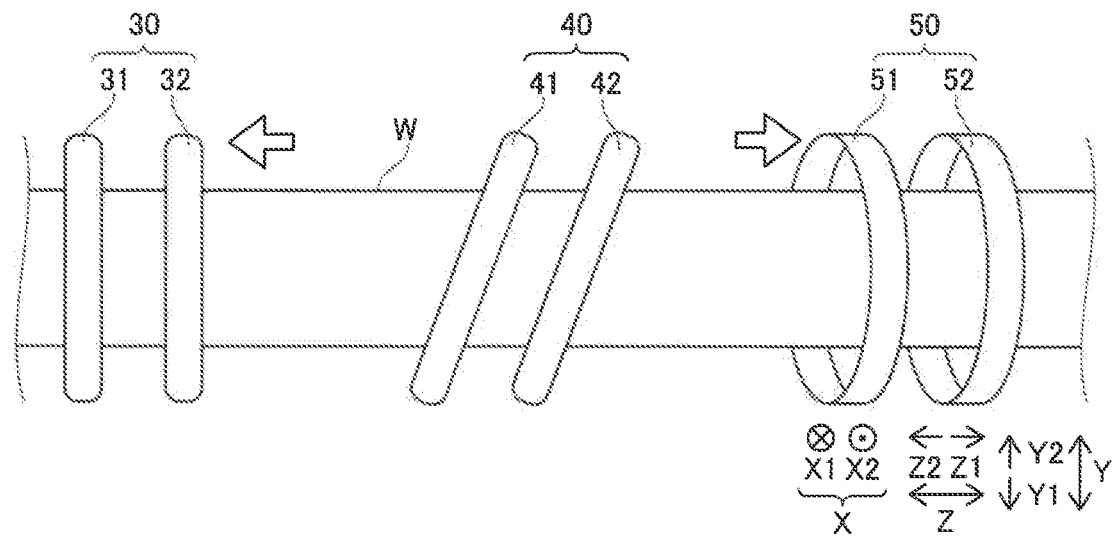
FIG. 10 is a side view (1) of detection coils according to the first embodiment.
Figure 11:
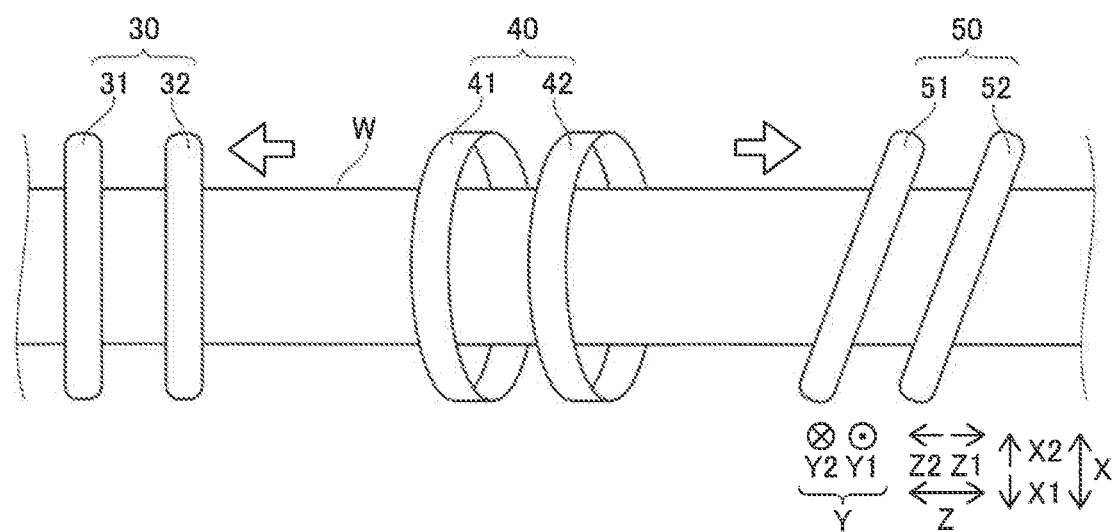
FIG. 11 is a side view (2) of detection coils according to the first embodiment.

In the first embodiment, the first detection coil 30, the second detection coil 40, and the third detection coil 50 are provided along the circumferential direction of the wire rope W. As shown in FIG. 10 and FIG. 11, the first detection coil 30 is arranged such that the first receiving coil 31 and the second receiving coil 32 are perpendicular to a first direction (Z-direction) along which the first detection coil 30 moves relative to the wire rope W when viewed from the X-direction and the Y-direction.

As shown in FIG. 10, the second detection coil 40 is arranged to be inclined to the first detection coil 30 when viewed from a direction (X-direction) perpendicular to the first direction (Z-direction) along which the first detection coil 30 moves relative to the wire rope W. Further, the second detection coil 40 is arranged to be inclined to the third detection coil 50 when viewed from the X-direction. That is, the second detection coil 40 is arranged to be inclined to the first detection coil 30 and the third detection coil 50 when viewed from the X-direction. The second detection coil 40 is arranged to be inclined along any of strands S (along the twist of the strand S) constituting the wire rope W (see FIG. 3) when viewed from the X-direction.

As shown in FIG. 11, the third detection coil 50 is arranged to be inclined to the first detection coil 30 when viewed from the Y-direction as a third direction perpendicular to the Z-direction and the X-direction. Further, the third detection coil 50 is arranged to be inclined to the second detection coil 40 when viewed from the Y-direction. That is, the third detection coil 50 is arranged to be inclined to the first detection coil 30 and the second detection coil 40 when viewed from the Y-direction. The third detection coil 50 is arranged to be inclined along any strand S (see FIG. 3) (along the twist of the strand S) constituting the wire rope W when viewed from the Y-direction.

(Configuration for Detecting Signal Detection)

Figure 12:
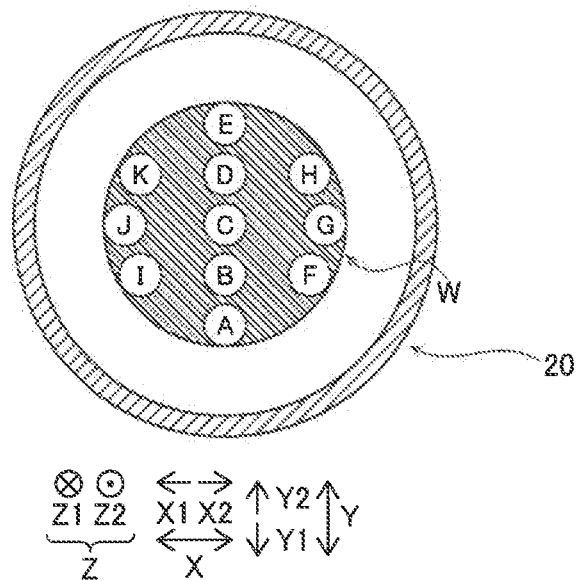
FIG. 12 is a diagram showing an example of cross-sectional positions of a wire rope.

Locations of cross-sectional positions A to K (detection positions) in a cross-sectional plane (XY-plane) of the wire rope W, which are the same in the position in the Z-direction, are shown in FIG. 12. Note that the cross-sectional position C is located at the center of the wire rope W. The cross-sectional positions A, B, C, D, and E are located in the order of the cross-sectional positions A, B, C, D, and E from the Y1-direction side. The cross-sectional position A is located at the Y1-direction side end of the wire rope W. The cross-sectional position E is located at the Y2-direction side end of the wire rope W. The cross-sectional positions B, F and I are located at the same position in the Y-direction. Further, the cross-sectional positions C, G, and J are located at the same position in the Y-direction. The cross-sectional positions D, H and K are located at the same position in the Y-direction.

The cross-sectional positions A to E are located at the center of the wire rope W in the X-direction. The cross-sectional position J is located at the X1-direction side end of the wire rope W. The cross-sectional position G is located at the X2-direction side end of the wire rope W. In the X-direction, the cross-sectional positions I and K are located between the cross-sectional position J and the cross-sectional positions A to E. The cross-sectional positions I and K are located at the same position in the X-direction. The cross-sectional positions F and H are located between the cross-sectional position G and the cross-sectional positions A to E in the X-direction. The cross-sectional position F and H are located at the same position in the X-direction. Note that the example of the detection signals shown in FIG. 13 to FIG. 15, which will be described later, is an example in which in the wire rope W, abnormality has occurred at all of the cross-sectional positions A to K which are located at the same cross-sectional position in the Z-direction. Further, in the example of the detection signals shown in FIG. 13 to FIG. 15, which will be described later, the detection coils 20 (the first detection coil 30, the second detection coil 40, and the third detection coil 50) are moved relative to the wire rope W in the Z2-direction.

Figure 13:
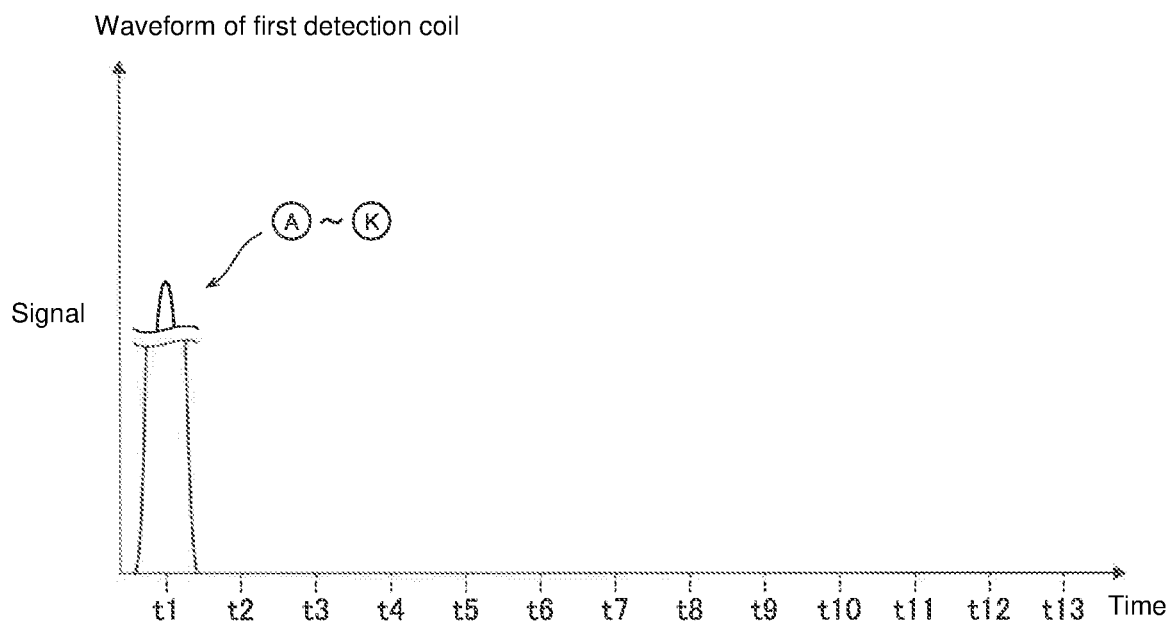
FIG. 13 is a diagram showing an example of a detection signal detected by a first detection coil.

As shown in FIG. 13, the first detection coil 30 is configured to detect a detection signal having a peak corresponding to the detection position in the Z-direction (first direction) of the wire rope W. Specifically, the first detection coil 30 detects, at the time t1, the detection signal having a peak corresponding to the detection signal at the cross-sectional positions A to K which are located at the same position in the Z-direction. The first detection coil 30 passes the cross-sectional position A to K of the wire rope W at the same time (time t1). As a result, in a case where an abnormality position is present at the cross-sectional positions A to K, as shown in FIG. 13, in the detection signal of the first detection coil 30, an abnormality signal (peak) is detected at the time t1. In a case where an abnormality is present at all of the cross-sectional positions A to K, in the detection signal of the first detection coil 30, at the time t1, a relatively large detection signal (peak) in which peaks corresponding to the detection signals at the cross-sectional positions A to K are overlapped (the detection signals are added) is detected.

The second detection coil 40 passes the cross-sectional positions A to K (detection positions) of the wire rope W in order from the Y1-direction side cross-sectional position. That is, at the time t4, the second detection coil 40 passes the cross-sectional position A. At the time t5, the second detection coil 40 passes the cross-sectional positions B, F and I. At the time t6, the second detection coil 40 passes the cross-sectional positions C, G, and J. At the time t7, the second detection coil 40 passes the cross-sectional positions D, H and K. Finally, at the time t8, the second detection coil 40 passes the cross-sectional position E.

Figure 14:
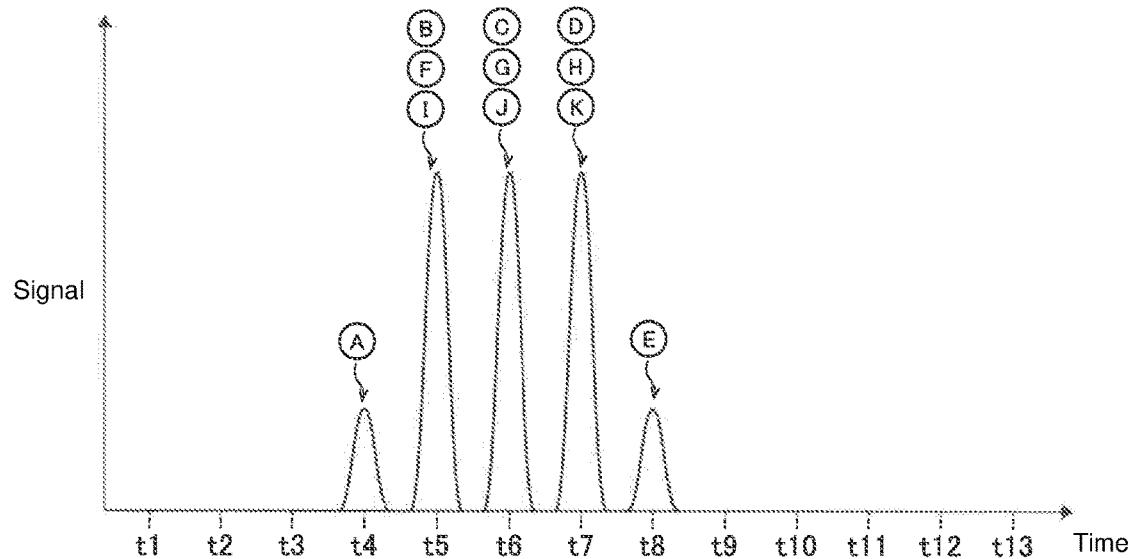
FIG. 14 is a diagram showing an example of a detection signal detected by a second detection coil.
Figure 15:
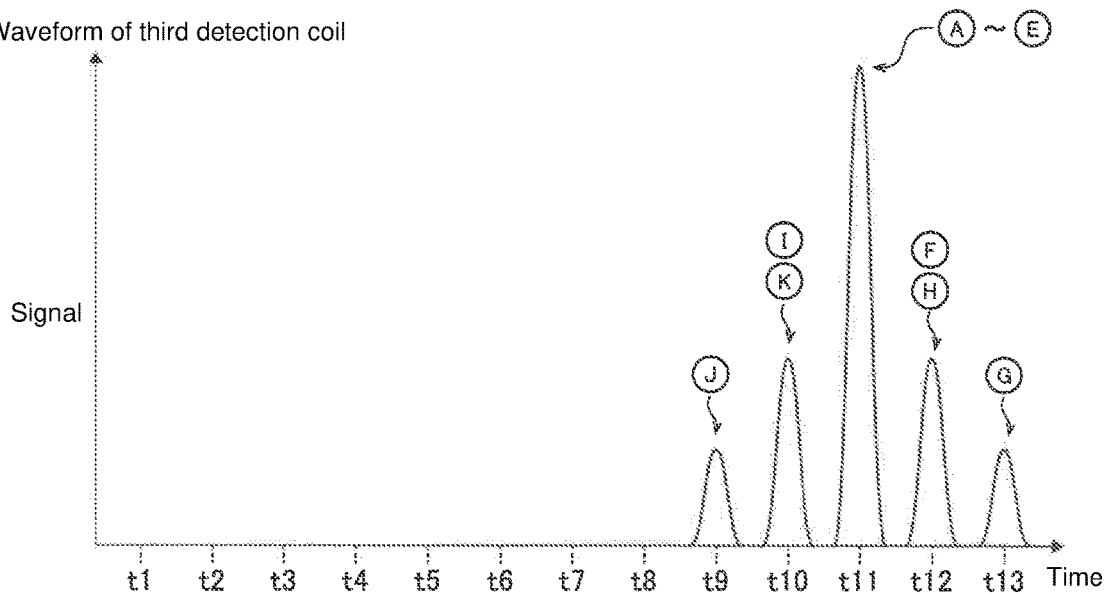
FIG. 15 is a diagram showing an example of a detection signal detected by a third detection coil.

In the first embodiment, as shown in FIG. 14, the second detection coil 40 is configured to detect the detection signal having peaks corresponding to the areas including the plurality of detection positions of the wire rope W in the Y-direction (the direction intersecting with the first direction).

Specifically, the second detection coil 40 is configured to detect the detection signal detected by the first detection coil 30 at the time t1 in such a manner as to separate the peaks of the detection signal corresponding to the areas including the cross-sectional positions A to K (detection positions) at which the detection signal was detected, in the Y-direction (the direction intersecting with the first direction). In a case where an abnormality has occurred at all of the cross-sectional positions A to K, the detection signal detected by the second detection coil 40 has a peak corresponding to the detection signal at the cross-sectional position A at the time t4. The detection signal detected by the second detection coil 40 has a peak in which the peaks of the detection signal at the cross-sectional positions B, F, and I are overlapped, at the time t5. Further, the detection signal detected by the second detection coil 40 has a peak in which the peaks of the detection signal at the cross-sectional positions C, G, and J are overlapped, at the time t6. The detection signal detected by the second detection coil 40 has a peak in which the peaks of the detection signal at the cross-sectional positions D, H, and K are overlapped, at the time t7. Further, the detection signal detected by the second detection coil 40 has a peak corresponding to the detection signal at the cross-sectional position E, at the time t8.

The third detection coil 50 sequentially passes the cross-sectional positions A to K (detection positions) of the wire rope W from the X1-direction side cross-sectional position. That is, the third detection coil 50 passes the cross-sectional position J at the time t9, and passes the cross-sectional positions I and K at the time t10. Then, the third detection coil 50 passes the cross-sectional positions A to E at the time t11 and passes the cross-sectional positions F and H at the time t12. Lastly, the third detection coil 50 passes the cross-sectional position G at the time t13.

In the first embodiment, the third detection coil 50 is configured to detect the detection signal having peaks corresponding to the areas including the plurality of detection positions of the wire rope W in the X-direction.

Specifically, the third detection coil 50 is configured to detect the detection signal detected by the first detection coil 30 at the time t1 in such a manner as to separate the peaks in the X-direction, the peaks corresponding to the areas including the cross-sectional positions A to K (detection positions) at which the first detection coil 30 detected the detection signal at the time t1. In a case where an abnormality has been detected at all of the cross-sectional positions A to K, the detection signal detected by the third detection coil 50 has a peak at the time t9 corresponding to the detection signal at the cross-sectional position J. The detection signal detected by the third direction coil 50 has a peak at time t10 in which the peaks corresponding to the detection signal at the cross-sectional positions I and K are overlapped. Further, the detection signal detected by the third detection coil 50 has a peak in which the peaks at the time t11 corresponding to the detection coils at the cross-section positions A to E are overlapped. The detection signal detected by the third detection coil 50 has peaks in which peaks at the time t12 corresponding to the detection signal at the cross-sectional positions F and H are overlapped. Further, the detection signal detected by the second detection coil 40 has a peak at the time t13 corresponding to the detection signal at the cross-sectional position G.

(Configuration of Processing Unit)

In the first embodiment, the processing unit 61 is configured to identify the abnormality position of the wire rope W in the Z-direction, based on the detection time of the peak of the detection signal detected by the first detection coil 30. Further, the processing unit 61 is configured to identify the abnormality position of the wire rope W in the cross-section (XY-plane) of the identified abnormality position of the wire rope W in the first direction (Z-direction), based on the detection time of the peak of the detection signal detected by the second detection coil 40 and the third detection coil 50.

In the first embodiment, the processing unit 61 is configured to identify the location of the abnormality position of the wire rope W in the Y-direction in the cross-section (XY-plane) at the identified abnormality position of the wire rope W in the first direction (Z-direction), based on the magnitude of the deviation of the detection time of the peak of the detection signal detected by the second detection coil 40 with respect to the detection time of the peak of the detection signal detected by the first detection coil 30. Further, in the first embodiment, the processing unit 61 is configured to identify the location of the abnormality position of the wire rope W in the X-direction in the cross-section (XY-plane) of the acquired abnormality position of the wire rope W in the first direction (Z-direction), based on the magnitude of the deviation of the detection time of the peak of the detection signal detected by the third detection coil 50 with respect to the detection time of the peak of the detection signal detected by the first detection coil 30 or the detection time of the peak of the detection signal detected by the second detection coil 40.

The processing unit 61 is configured to identify the location of the abnormality position of the wire rope W in the Z-direction based on the detection time of the peak of the detection signal detected by the first detection coil 30. For example, in a case where the peak of the abnormality signal is detected at the time t1, the location of the abnormality position in the Z-direction is the location of the cross-sectional positions A to K in the Z-direction.

The processing unit 61 is configured to identify the location of the abnormality position of the wire rope W in the Y-direction in the cross-section (XY-plane) of the identified abnormality positions of the wire rope W in the first direction (Z-direction), based on the detection time of the peak of the detection signal detected by the second detection coil 40. For example, in a case where the peak of the abnormality signal is detected at the time t7, the abnormality position in the X-direction is the location of the cross-sectional positions D, H and K in the X-direction.

Further, the processing unit 61 is configured to identify the location of the abnormality position of the wire rope W in the X-direction in the cross-section (XY-plane) of the identified abnormality position of the wire rope W in the first direction (Z-direction), based on the detection time of the peak of the detection signal detected by the third detection coil 50. For example, in a case where the peak of the abnormality signal is detected at the time t12, the location of the abnormality position in the Y-direction is the location of the cross-sectional position F and H in the Y-direction.

Here, in a case where an abnormality is present at the cross-sectional position H among the cross-sectional positions A to K, the detection signal detected by the first detection coil 30 has a peak of the abnormal signal at the time t1, the detection signal detected by the second detection coil 40 has a peak of the abnormality signal at time t7, and the detection signal detected by the third detection coil 50 has a peak of the abnormality signal at the time t12. The processing unit 61 can identify that the abnormality position is located at the location of the cross-sectional position A to K in the Z-direction, at the location of the cross-sectional positions D, H, and K in the Y-direction, and at the location of the cross-sectional positions F and H in the X-direction, based on the peaks of the detection signals detected by each of the first detection coil 30, the second detection coil 40, and the third detection coil 50. Accordingly, the processing unit 61 can identify that the abnormality position is located at the cross-sectional position H, based on the peak of the detection signal detected by each of the first detection coil 30, the second detection coil 40, and the third detection coil 50.

Further, in a case where an abnormality has occurred at the cross-sectional positions C and H among the cross-sectional positions A to K, the detection signal detected by the first detection coil 30 has a peak of the abnormality signal at the time t1, the detection signal detected by the second detection coil 40 has peaks of the abnormality signal at the times t6 and t7, and the detected detection signal detected by the third detection coil 50 has a peak of the abnormality signal at the times t11 and t12. The processing unit 61 can identify that the abnormality position is located at the location of the cross-sectional positions A to K in the Z-direction, based on the peak of the detection signal detected by the first detection coil 30. Further, the processing unit 61 can determine that the abnormality position is located at the location of the cross-sectional positions C, G, and J and the location of the cross-sectional positions D, H, and K in the Y-direction, based on the peak of the detection signal detected by the second detection coil 40. The processing unit 61 can determine that the abnormality position is located at the location of the cross-sectional position A to E and the location of the cross-sectional positions F and H in the X-direction, based on the peak of the detection signal detected by each of the first detection coil 30, the second detection coil 40, and the third detection coil 50. Therefore, based on the peak of the detection signal detected by each of the first detection coil 30, the second detection coil 40, and the third detection coil 50, the processing unit 61 can determine that the abnormality position is located at either three locations of the cross-sectional positions C, D, and H or two locations of the cross-sectional positions C, and H. Then, in a case where the height of the peak of the abnormality signal at the time t6 is about the same as the height of the peak of the abnormality signal at the time t7, it is considered that peaks (the peaks at the cross-sectional position D and H) of the plurality of abnormality signals are not overlapped at the time t7, and therefore, the processing unit 61 can identify that the abnormality position is located at the cross-sectional positions C and H. From these findings, the processing unit 61 can identify that the abnormality position is located at the cross-sectional positions C and H. That is, the wire rope inspection device 100 according to the first embodiment can identify the plurality of abnormality positions in the cross-section of the wire rope W.

The processing unit 61 is configured to identify the abnormality position of the plurality of wire ropes W in each cross-section (XY-plane) in a direction intersecting with the Z-direction, based on the peak of the detection signal detected by each of the first detection coil 30, the second detection coil 40, and the third detection coil 50.

Note that the abnormality positions of the wire rope W in the cross-section (XY-plane) identified by the processing unit 61 is displayed on the display unit 204 of the processing device 200 as shown in FIG. 12.

Effects of First Embodiment

In the first embodiment, the following effects can be obtained.

In the first embodiment, as described above, the plurality of detection coils 20 includes the first detection coil 30 and the second detection coil 40 provided along the circumferential direction of the wire rope W. The second detection coil 40 is provided along circumferential direction of the wire rope W and is arranged to be inclined to the first detection coil 30 when viewed from a direction (X-direction) perpendicular to the first direction (Z-direction) along which the first detection coil 30 moves relative to the wire rope W. Here, the second detection coil 40 is arranged to be inclined to the first detection coil 30 when viewed from the X-direction perpendicular to the Z-direction. Therefore, the time for each of the first detection coil 30 and the second detection coil 40 to pass the abnormality area in the cross-section of the wire rope W differs depending on the location on the cross-section of the abnormality area of the wire rope W. With this, it is possible to detect the abnormal detection signal detected by the first detection coil 30 and the abnormal detection signal detected by the second detection coil 40 at different times depending on the location in the cross-section of the abnormality area in the cross-section of the wire rope W. The geometric inclination arrangement of the second detection coil 40 is known in advance. Therefore, it is possible to identify the abnormality area in the cross-section of the wire rope W, based on the deviation of the detection time between the abnormal detection signal detected by the first detection coil 30 and the abnormal detection signal detected by the second detection coil 40. Consequently, in addition to the abnormality position in the direction (Z-direction) along which the detection coils 20 (the first detection coil 30, the second detection coil 40, and the third detection coil 50) move relative to the wire rope W, the abnormality area in the cross-section of the wire rope W can be identified.

Further, in the wire rope inspection device 100 according to the first embodiment, the following further effects can be obtained by configuring as follows.

In the first embodiment, as described above, the processing unit 61 is configured to identify the abnormality position of the wire rope W in the first direction (Z-direction) which is the direction along which the detection coils 20 move relative to the wire rope W based on the detection time of the peak of the detection signal detected by the first detection coil 30. This makes it possible to identify the abnormality position of the wire rope W in the Z-direction from the time until the abnormal detection signal is detected by the first detection coil 30. Therefore, the abnormality position of the wire rope W in the Z-direction can be identified more easily. In addition, the processing unit 61 is configured to identify the abnormality position of the wire rope W in the cross-section (XY-plane) of the abnormality position of the wire rope W in the Z-direction, based on the detection time of the peak of the detection signal detected by the second detection coil 40. Accordingly, it is possible to identify the abnormality position of the wire rope W in the cross-section (XY-plane) of the wire rope W from the time until the abnormal detection signal is detected by the second detection coil 40. Therefore, it is possible to easily identify the abnormality position in the cross-section (XY-plane) of the wire rope W.

Further, in the first embodiment, the processing unit 61 is configured to identify the abnormality position of the wire rope W in the cross-section (XY-plane) of the acquired abnormality position of the wire rope W in the first direction (Z-direction), based on the magnitude of the deviation of the detection time of the peak of the detection signal detected by the second detection coil 40 to the detection time of the peak of the detection signal detected by the first detection coil 30. With this, it is possible to identify the abnormality position of the wire rope W in the cross-section (XY-plane) of the wire rope W from the magnitude of the deviation of the peak detection time of the abnormal detection signal detected by the second detection coil 40 to the peak detection time of the abnormal detection signal detected by the first detection coil 30. Therefore, it is possible to easily identify the abnormality position in the cross-section (XY-plane) of the wire rope W.

Further, in the first embodiment, as described above, the plurality of detection coils 20 includes the third detection coil 50 arranged to be inclined to the first detection coil 30 when viewed from the Y-direction. Here, the third detection coil 50 is arranged to be inclined to the first detection coil 30 when viewed from the Y-direction perpendicular to the Z-direction. Therefore, the deviation of the detection time between the abnormal detection signal detected by the first detection coil 30 and the abnormal detection signal detected by the third detection coil 50 differs depending on the location of the abnormality position in the cross-section of the wire rope W in the X-direction. Accordingly, the location of the abnormality position in the cross-section of the wire rope W in the X-direction can be identified based on the magnitude of the deviation of the detection time between the abnormal detection signal detected by the first detection coil 30 and the abnormal detection signal detected by the third detection coil 50. Consequently, in addition to the abnormality position in the direction (Z-direction) along which the detection coil 20 (the first detection coil 30, the second detection coil 40, and the third detection coil 50) moves relative to the wire rope W, the location of the abnormality position in the X-direction in the cross-section of the wire rope W can be easily identified.

Further, in the first embodiment, as described above, the second detection coil 40 is arranged to be inclined to the first detection coil 30 and the third detection coil 50 when viewed from the X-direction. The third detection coil 50 is arranged to be inclined to the first detection coil 30 and the second detection coil 40 when viewed from the Y-direction. Here, the second detection coil 40 is arranged to be inclined to the first detection coil 30 and the third detection coil 50 when viewed from the X-direction perpendicular to the Z-direction. Therefore, the deviation of the detection time between the abnormal detection signal detected by the first detection coil 30, the abnormal detection signal detected by the second detection coil 40, and the abnormal detection signal detected by the third detection coil 50 differs depending the location of the abnormality position in the Y-direction in the cross-section of the wire rope W. This makes it possible to identify the position of the abnormal detection signal detected in the cross-section of the wire rope W in the Y-direction, based on the magnitude of the deviation of the detection time between the abnormal detection signal detected by the first detection coil 30, the abnormal detection signal detected by the second detection coil 40, and the abnormal detection signal detected by the third detection coil 50. Further, the third detection coil 50 is arranged to be inclined to the first detection coil 30 and the second detection coil 40 when viewed from the Y-direction perpendicular to the Z-direction. Therefore, the deviation of the detection time between the abnormal detection signal detected by the first detection coil 30, the abnormal direction signal detected by the second detection coil 40, and the abnormal detection signal detected by the third detection coil 50 differs depending on the location of the abnormality position in the X-direction in the cross-section of the wire rope W. With this, it is possible to identify the location of the abnormality position in the X-direction in the cross-section of the wire rope W, based on the magnitude of the deviation of the detection time between the abnormal signal detected by the first detection coil 30, the abnormal signal detected by the second detection coil 40, and the abnormal signal detected by the third detection coil 50. Consequently, in addition to the abnormality position in the direction (Z-direction) along which the detection coil 20 (the first detection coil 30, the second detection coil 40, and the third detection coil 50) moves relative to the wire rope W, the abnormality position in the X-direction and the abnormality position in the Y-direction in the cross-section of the wire rope W can be easily identified.

Further, in the first embodiment, as described above, the processing unit 61 identifies the location of the abnormality positions of the wire rope W in the Z-direction, based on the detection time of the peak of the detection signal detected by the first detection coil 30. This makes it possible to identify the abnormality position of the wire rope W in the Z-direction from the time until the time when the abnormal detection signal detected by the first detection coil 30 is detected. Therefore, the abnormality positions of the wire rope W in the Z-direction can be easily identified. Further, the location of the abnormality position of the wire rope W in the Y-direction in the cross-section (XY-plane) of the identified abnormality position of the wire rope W in the Z-direction is identified, based on the detection time of the peak of the detection signal detected by the second detection coil 40. With this, it is possible to identify the abnormality position of the wire rope W in the Y-direction from the time until the abnormal detection signal detected by the second detection coil 40 is detected. Therefore, it is possible to more easily identify the abnormality position of the wire rope W in the Y-direction in the XY-plane. Further, the processing unit 61 is configured to identify the position of the abnormality position of the wire rope W in the X-direction in the cross-section (XY-plane) of the identified abnormality position of the wire rope W in the Z-direction, based on the detection time of the peak of the detection signal detected by the third detection coil 50. This makes it possible to identify the abnormality position of the wire rope W in the X-direction from the time until the abnormal detection signal detected by the third detection coil 50 is detected. Therefore, the abnormality position of the wire rope W in the X-direction in the XY-plane can be identified more easily. Consequently, the location of the abnormality positions of the wire rope W in the Z-direction, the location of the abnormality positions of the wire rope W in the X-direction, and the location of the abnormality positions of the wire rope W in the Y-direction can be identified more easily.

Further, in the first embodiment, as described above, the processing unit 61 is configured to identify the abnormality position in each of the cross-sections of the plurality of wire ropes W in a direction intersecting with the Z-direction, based on the peak of the detection signal detected by each of the first detection coil 30, the second detection coil 40, and the third detection coil 50. As a result, it is possible to collectively identify the abnormality position in the cross-section of each of the plurality of wire ropes W.

Further, in the first embodiment, as described above, the first detection coil 30, the second detection coil 40, and the third detection coil 50 are provided to each of the plurality of wire ropes W. With this, it is possible to accurately identify the abnormality position of each of the plurality of wire ropes W, as compared with the case in which the first detection coil 30, the second detection coil 40, and the third detection coil 50 are commonly provided to a plurality of wire ropes W.

Further, in the first embodiment, as described above, the excitation coil 10 (excitation unit) configured to move relative to the wire rope W and apply magnetic flux to the wire rope W is provided, and the excitation coil 10 is commonly provided to the plurality of detection coils 20 (the first detection coil 30, the second detection coil 40, and the third detection coil 50). Thus, unlike the case where the excitation coil 10 is provided to each of the detection coils 20 (the first detection coil 30, the second detection coil 40, and the third detection coil 50), the plurality of detection coils 20 is not affected by the magnetic flux applied by the excitation coil 10 other than the excitation coil 10 corresponding to each of the plurality of detection coils 20. Consequently, each of the first detection coil 30, the second detection coil 40, and the third detection coil 50 can accurately detect a detection signal.

Further, in the first embodiment, as described above, it is provided with the magnetic field application unit 71 and 72 configured to apply a magnetic flied to the wire rope W in advance to adjust the magnitude and the orientation of the magnetic field of the wire rope W made of a magnetic body. The excitation coil 10 (excitation unit) is configured to apply a magnetic field generated by causing an alternating current to flow through the wire rope W. This makes it possible for the magnetic field application units 71 and 72 to adjust the magnitude and the orientation of the magnetization of the wire rope W to which the magnetic field is applied by the excitation coil 10. Consequently, it is possible to suppress the generation of noises in the detection signal detected by the detection coil 20 (the first detection coil 30, the second detection coil 40, and the third detection coil 50).

Second Embodiment

Figure 16:
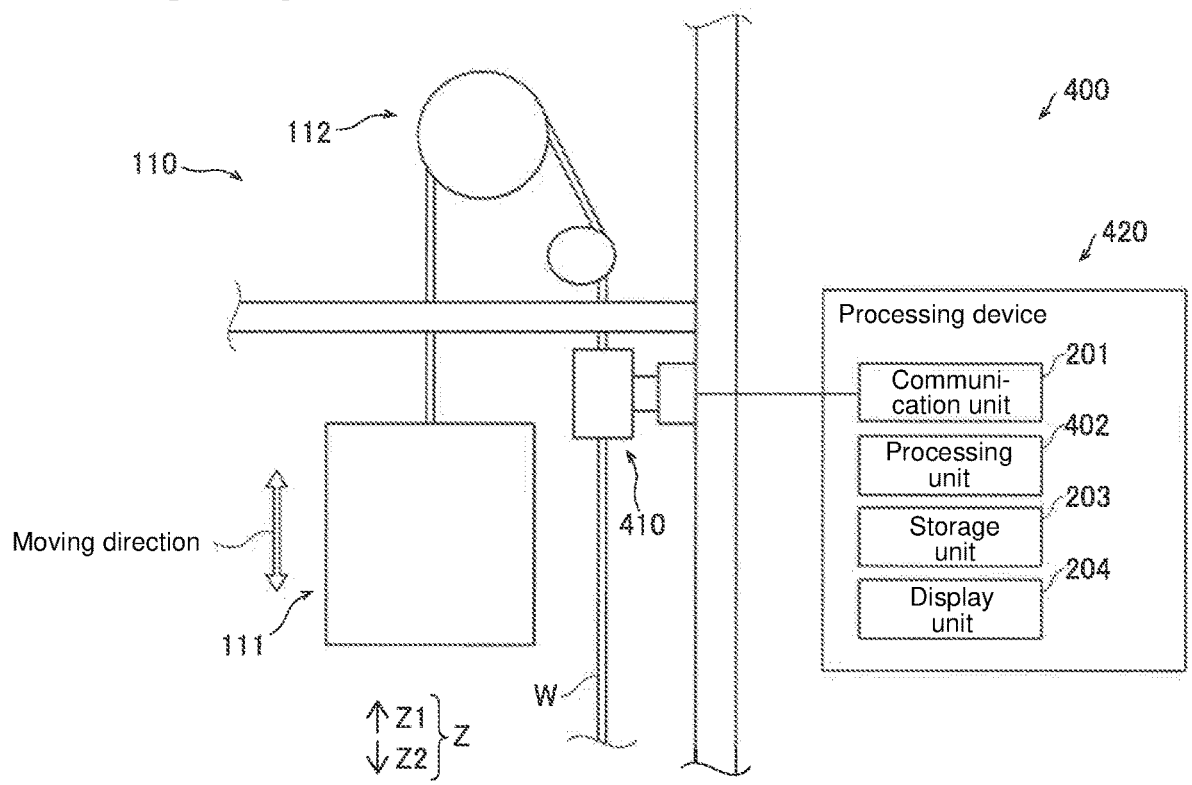
FIG. 16 is a diagram showing a hoist way and an elevator in which a wire rope inspection device according to a second embodiment is provided.

With reference to FIG. 16, a configuration of a wire rope inspection system 400 according to a second embodiment will be described.

In the second embodiment, instead of the processing unit 61 of the wire rope inspection device 100, a processing device 420 of the wire rope inspection system 400 is configured to identify the abnormality position of the wire rope W in the Z-direction and identify the area of the abnormality position of the wire rope W in the cross-section of the identified abnormality position of the wire rope W in the Z-direction. Specifically, the processing unit 61 (see FIG. 2) of the wire rope inspection device 410 performs processing to transmit the detection signal of each of the first detection coil 30, the second detection coil 40, and the third detection coil 50 to the processing device 420 via the communication unit 60. The processing unit 402 of the processing device 420 is configured to acquire and process the detection signal detected by each of the first detection coil 30, the second detection coil 40, and the third detection coil 50 via the communication unit 201.

The processing unit 402 of the processing device 420 is configured as follows. That is, the processing unit 402 identifies the abnormality position of the wire rope W in the Z-direction based on the detection signal detected by the first detection coil 30. And the processing unit 402 identifies the abnormality position of the wire rope W in the cross-section of the identified abnormality position of the wire rope W in the Z-direction based on the detection signals detected by the second detection coil 40 and the third detection coil 50.

Note that other configurations and effects of the second embodiment are the same as those of the first embodiment.

Third Embodiment

Figure 17:
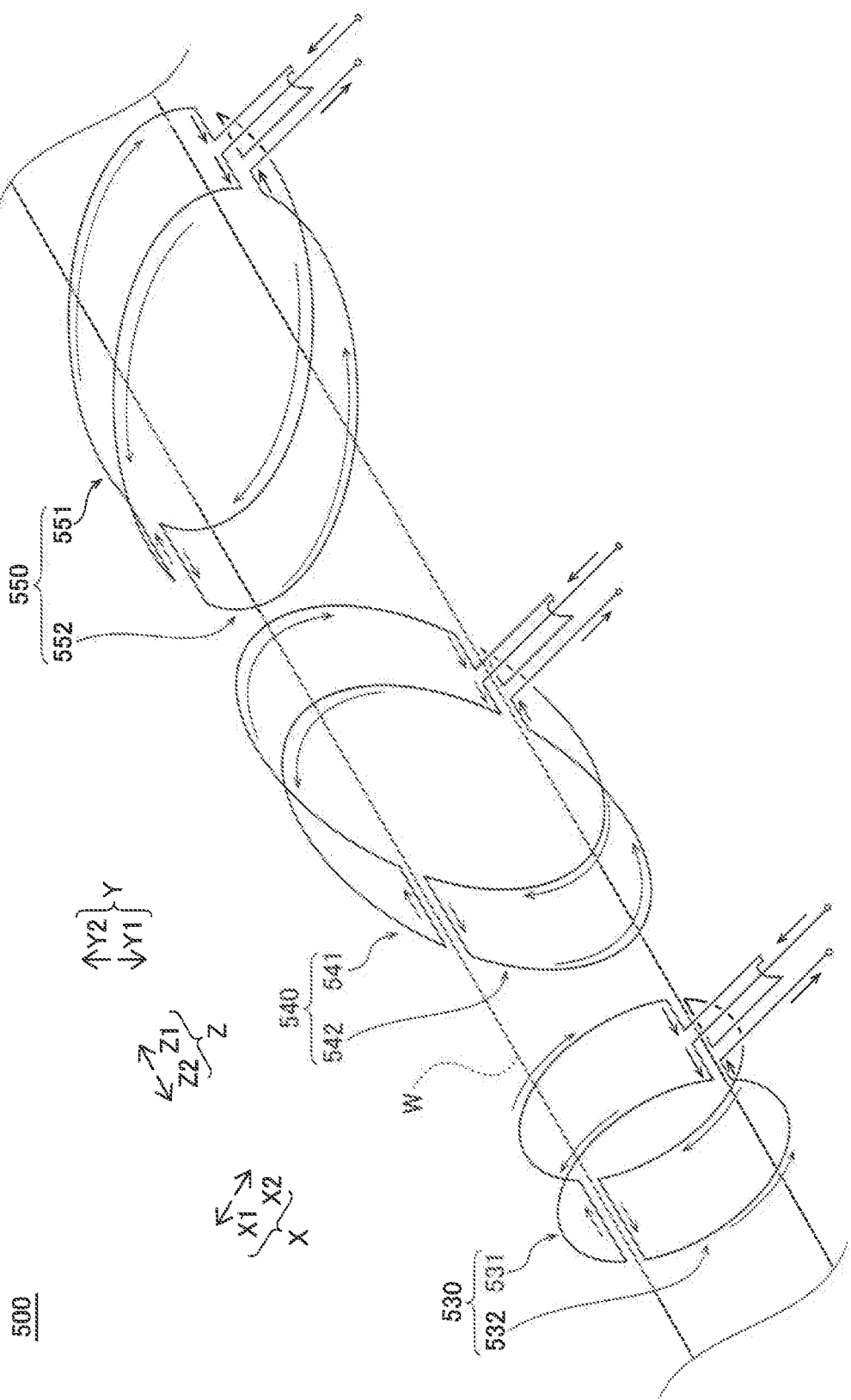
FIG. 17 is a diagram showing detection coils in a wire rope inspection device according to a third embodiment.

With reference to FIG. 17, a configuration of a wire rope inspection system 500 according to a third embodiment will be described.

In the third embodiment, a first detection coil 530, a second detection coil 540, and a third detection coil 550 are configured to be dividable in the Y-direction perpendicular to the Z-direction. That is, the first detection coil 530, the second detection coil 540, and the third detection coil 550 are configured to be dividable in the Y-direction perpendicular to the longitudinal direction (Z-direction) of the plurality of wire ropes W and the X-direction along which the plurality of wire ropes W is adjacently arranged.

The first detection coil 530 includes a first receiving coil 531 and a second receiving coil 532. The first receiving coil 531 is arranged in a direction (Y-direction) perpendicular to the Z-direction. The second receiving coil 532 is arranged so as to sandwich the wire rope W together with the first receiving coil 531 on a side (Y1-direction side) opposite to the side (Y2-direction side) where the first receiving coil 531 is arranged with respect to the wire rope W. The first receiving coil 531 and the second receiving coil 532 are differentially connected. Note that the first receiving coil 531 is an example of the "first portion" recited in claims and that the second receiving coil 532 is an example of the "second portion" recited in claims.

The first receiving coil 531 and the second receiving coil 532 are connected in series in such a direction that the coil winding direction is reversed and are configured to cause a current to flow in the opposite directions with respect to the change in the magnetic flux in the Z1-direction.

Further, the second detection coil 540 includes a first receiving coil 541 and a second receiving coil 542. The first receiving coil 541 is arranged in a direction (Y-direction) perpendicular to the Z-direction. The second receiving coil 542 is arranged so as to sandwich the wire rope W together with the first receiving coil 541 on a side (Y1-direction side) opposite to the side (Y2-direction side) where the first receiving coil 541 is arranged with respect to the wire rope W. The first receiving coil 541 and the second receiving coil 542 are differentially connected. Note that the first receiving coil 541 is an example of the "first portion" recited in claims and that the second receiving coil 542 is an example of the "second portion" recited in claims.

The first receiving coil 541 and the second receiving coil 542 are connected in series in such a direction that the coil winding direction is reversed and are configured to cause a current to flow in the opposite direction with respect to the change in the magnetic flux in the Z1-direction.

Further, the third detection coil 550 includes a first receiving coil 551 and a second receiving coil 552. The first receiving coil 551 is arranged in a direction (Y-direction) perpendicular to the Z-direction. The second receiving coil 552 is arranged so as to sandwich the wire rope W together with the first receiving coil 551 on a side (Y1-direction side) opposite to the side (Y2-direction side) where the first receiving coil 551 is arranged with respect to the wire rope W. The first receiving coil 551 and the second receiving coil 552 are differentially connected. Note that the first receiving coil 551 is an example of the "first portion" recited in claims and that the second receiving coil 552 is an example of the "second portion" recited in claims.

The first receiving coil 551 and the second receiving coil 552 are connected in series in such a direction that the coil winding direction is reversed and are configured to cause a current to flow in the opposite direction with respect to the change in the magnetic flux in the Z1-direction.

Note that other configurations of the third embodiment are the same as those of the first embodiment.

Effects of Third Embodiment

In the third embodiment, the following effects can be obtained.

In the third embodiment, as described above, it includes the first receiving coil 531, 541, and 551 (first portion) and the second receiving coil 532, 542, and 552 (second portion). The first receiving coil 531, 541, and 551 (first portion) is arranged such that each of the first detection coil 530, the second detection coil 540, and the third detection coil 550 is perpendicular to a direction (Y-direction) perpendicular to the Z-direction. The second receiving coil 532, 542 and 552 (second portions) is arranged to sandwich the wire rope W with the first receiving coil 531, 541 and 551 on the other side of the wire rope W opposite the side where the first receiving coil 531, 541 and 551 is arranged. As a result, the first detection coil 530 can be divided into the first receiving coil 531 and the second receiving coil 532 in the Y-direction perpendicular to the Z-direction. The second detection coil 540 can be divided into the first receiving coil 541 and the second receiving coil 542 in the Y-direction perpendicular to the Z-direction. The third detection coil 550 can be divided into the first receiving coil 551 and the second receiving coil 552 in the Y-direction perpendicular to the Z-direction. Consequently, the attachment or the detachment of the first detection coil 530, the second detection coil 540, and the third detection coil 550 with respect to the wire rope W can be easily performed.

Note that other effects of the third embodiment are the same as those of the first embodiment.

Modifications

It should be understood that the embodiments disclosed here are examples in all respects and are not restrictive. The scope of the present invention is indicated by the appended claims rather than by the description of the above-described embodiments and includes all modifications (changes) within the meanings and the scopes equivalent to the scope of the claims.

For example, in the first and second embodiments described above, an example is shown in which the wire rope inspection systems 300 and 400 are systems for inspecting the wire ropes W used for the elevator 110, but the present invention is not limited thereto. In the present invention, the wire rope inspection system may be a system for inspecting a wire rope used in cranes, suspension bridges, robotics, etc. Note that in a case where the wire rope itself does not move, as in a wire rope used for suspension bridges, the wire rope inspection device may measure the magnetic flux of the wire rope while moving the wire rope inspection device along the wire rope.

Further, in the above-described first embodiment, an example is shown in which the processing unit 61 detects the abnormality of the wire rope W based on the peak of the detection signal detected by the detection coils 20, but the present invention is not limited thereto. In the present invention, the abnormality of the wire rope may be detected based on criteria other than the peak of the detection signal detected by the plurality of detection coils.

In the first embodiment, as described above, an example is shown in which the second detection coil 40 is arranged to be inclined to the first detection coil 30 when viewed from the X-direction (direction perpendicular to the first direction), but the present invention is not limited thereto. In the present invention, the second detection coil may be arranged to be inclined to the first detection coil when viewed from the Y-direction perpendicular to the first direction.

Further, in the first embodiment, as described above, an example is shown in which the plurality of detection coils 20 includes the third detection coil 50 arranged to be inclined to the first detection coil 30 when viewed from the Y-direction, but the present invention is not limited thereto. In the present invention, it may be configured to detect the area of the abnormality position of the wire rope in any direction perpendicular to the first direction in the cross-section of the wire rope, based on the detection signals detected by the first detection coil and the second detection coil, without using the third detection coil.

Further, in the first embodiment, as described above, an example is shown in which the second detection coil 40 is arranged to be inclined to the first detection coil 30 and the third detection coil 50 when viewed from the X-direction, and the third detection coil 50 is arranged to be inclined to the first detection coil 30 and the second detection coil 40 when viewed from the Y-direction, but the present invention is not limited thereto. In the present invention, the second detection coil may be arranged to be inclined to one of the first detection coil and the third detection coil when viewed from the X-direction. Further, the third detection coil may be arranged to be inclined to one of the first detection coil and the second detection coil when viewed from the Y-direction.

Further, in the first embodiment, as described above, an example is shown in which the first detection coil 30, the second detection coil 40, and the third detection coil 50 are provided to each of the plurality of wire ropes W, but the present invention is not limited thereto. In the present invention, the first detection coil, the second detection coil, and the third detection coil may be commonly provided to each of the plurality of wire ropes. Further, in the present invention, any one of the first detection coil, the second detection coil, and the third detection coil may be commonly provided to each of the plurality of wire ropes. Further, any one of the first detection coil, the second detection coil, and the third detection coil may be provided to each of the plurality of wire ropes.

Further, in the first embodiment, an example is shown in which the excitation coil 10 (excitation unit) is commonly provided to the plurality of detection coils 20 (the first detection coil 30, the second detection coil 40, and the third detection coil 50), but the present invention is not limited thereto. In the present invention, the excitation unit may be provided to each of the first detection coil, the second detection coil, and the third detection coil.

Aspects

It will be understood by those skilled in the art that the above-described exemplary embodiments are concrete examples of the following aspects.

(Item 1)

A wire rope inspection device comprising:
  a plurality of detection coils each configured to move relative to a wire rope in a direction along which the wire rope extends and detect magnetic flux of the wire rope; and
  a processing unit configured to acquire and process detection signals detected by the plurality of detection coils,
  wherein the plurality of detection coils includes a first detection coil and a second detection coil, the first detection coil being provided along a circumference direction of the wire rope, the second detection coil being provided along the circumference direction of the wire rope and arranged to be inclined to the first detection coil when viewed from a direction perpendicular to a first direction along which the first detection coil moves relative to the wire rope, and
  wherein the processing unit is configured to identify an abnormality position of the wire rope in the first direction based on a detection signal detected by the first detection coil and identify an area of the abnormality position of the wire rope in a cross-section of the identified abnormality position of the wire rope in the first direction, based on a detection signal detected by the second detection coil.

(Item 2)

The wire rope inspection device as recited in the above-described Item 1,
  wherein the first detection coil is configured to detect a detection signal having a peak corresponding to a detection position of the wire rope in the first direction,
  wherein the second detection coil is configured to detect a detection signal having peaks corresponding to an area including a plurality of detection positions of the wire rope in a direction intersecting with the first direction, and
  wherein the processing unit is configured to
  identify the abnormality position of the wire rope in the first direction based on a detection time of a peak of a detection signal detected by the first detection coil and
  identify the abnormality position of the wire rope in the cross-section of the identified abnormality position of the wire rope in the first direction based on a detection time of the peak of the detection signal detected by the second detection coil.

(Item 3)

The wire rope inspection device as recited in the above-described Item 2,
  wherein the processing unit is configured to identify the abnormality position of the wire rope in the cross-section of the identified abnormality position of the wire rope in the first direction, based on a magnitude of a deviation of a detection signal of the peak of the detection signal detected by the second detection coil to a detection time of the peak of the detection time detected by the first detection coil.

(Item 4)

The wire rope inspection device as recited in any one of the above-described Items 1 to 3,
  wherein the second detection coil is arranged to be inclined to the first detection coil when viewed from an X-direction as a second direction perpendicular to a Z-direction as the first direction,
  wherein the plurality of detection coils further includes a third detection coil provided along the circumferential direction of the wire rope and arranged to be inclined to the first detection coil when viewed from a Y-direction as a third direction perpendicular to the Z-direction and the X-direction, and
  wherein the processing unit is configured to
  identify the abnormality position of the wire rope in the Z-direction based on the detection signal detected by the first detection coil and
  identify the abnormality position of the wire rope in the cross-section of the identified abnormality position of the wire rope in the first direction, based on detection signals detected by the second detection coil and the third detection coil.

(Item 5)

The wire rope inspection device as recited in the above-described Item 4,
  wherein the second detection coil is arranged to be inclined to the first detection coil and the third detection coil when viewed from the X-direction, and
  wherein the third detection coil is arranged to be inclined to the first detection coil and the second detection coil when viewed from the Y-direction.

(Item 6)

The wire rope inspection device as recited in the above-described Item 5,
  wherein the first detection coil is configured to detect the detection signal having the peak corresponding to the detection position of the wire rope in the Z-direction,
  wherein the second detection coil is configured to detect the detection signal having a peak corresponding to an area including the plurality of detection positions of the wire rope in the Y-direction,
  wherein the third detection coil is configured to detect the detection signal having the peak corresponding to an area including a plurality of detection positions of the wire rope in the X-direction, and
  wherein the processing unit is configured to
  identify the position of the abnormality position of the wire rope in the Z-direction, based on the detection time of the peak of the detection signal detected by the first detection coil,
  identify the position of the abnormality position of the wire rope in the Y-direction in the cross-section of the identified abnormality position of the wire rope, based on the detection time of the peak of the detection signal detected by the second detection coil, and
  identify the position of the abnormality position of the wire rope in the X-direction in the cross-section of the identified abnormality position of the wire rope in the Z-direction, based on the detection time of the peak of the detection signal detected by the third detection coil.

(Item 7)

The wire rope inspection device as recited in the above-described Item 4 or 5,
  wherein the wire rope is composed of a plurality of wire ropes, and
  wherein the processing unit is configured to identify the abnormality position in the cross-section of each of the plurality of wire ropes in a direction intersecting with the Z-direction, based on peaks of detection signals detected by the first detection coil, the second detection coil, and the third detection coil.

(Item 8)

The wire rope inspection device as recited in the above-described Item 7,
  wherein the first detection coil, the second detection coil, and the third detection coil are provided to each of the plurality of wire ropes.

(Item 9)

The wire rope inspection device as recited in the above-described Item 8,
  wherein each of the first detection coil, the second detection coil, and the third detection coil includes a first portion arranged in a direction perpendicular to the Z-direction and a second portion arranged to sandwich the wire rope together with the first portion on a side opposite to a side where the first portion is arranged with respect to the wire rope.

(Item 10)

The wire rope inspection device as recited in any one of the above-described Items 1 to 9, further comprising:
  an excitation unit configured to move relative to the wire rope and apply magnetic flux to the wire rope;
  wherein the excitation unit is commonly provided to the plurality of detection coils.

(Item 11)

The wire rope inspection device as recited in the above-described Item 10, further comprising:
  a magnetic field application unit configured to apply a magnetic field in advance to the wire rope to adjust magnitude and direction of a magnetic field of the wire rope as a magnetic body,
  wherein the excitation unit is configured to apply a magnetic field generated by causing an alternating current to flow through the wire rope.

(Item 12)

A wire rope inspection system comprising:
  a wire rope inspection device provided with a plurality of detection coils, the plurality of detection coils each being configured to move relative to the wire rope in a direction along which the wire rope extends and detect magnetic flux of the wire rope; and
  a processing device configured to acquire and process detection signals detected by the plurality of detection coils,
  wherein the plurality of detection coils includes a first detection coil and a second detection coil, the first detection coil being provided along a circumference direction of the wire rope, the second detection coil being provided along the circumference direction of the wire rope and arranged to be inclined to the first detection coil when viewed from a direction perpendicular to a first direction along which the first detection coil moves relative to the wire rope, and
  wherein the processing device is configured to
  identify an abnormality position of the wire rope in the first direction, based on the detection signal detected by the first detection coil, and identify an area of the abnormality position of the wire rope in a cross-section of the acquired abnormality position of the wire rope in the first direction, based on a detection signal detected by the second detection coil.

DESCRIPTION OF SYMBOLS

10: Excitation coil (excitation unit)
20: Detection coil
30, 530: First detection coil
40, 540: Second detection coil
50, 550: Third detection coil
61: Processing unit
71, 72: Magnetic field application unit
100: Wire rope inspection device
200: Processing device
300: Wire rope inspection system
400: Wire rope inspection system
402: Processing unit
410: Wire rope inspection device
420: Processing device
531, 541, 551: Coil (first portion)
532, 542, 552: Coil (second portion)
W: Wire rope

The invention claimed is:

1. A wire rope inspection device comprising:
a plurality of detection coils each configured to move relative to a wire rope in a direction along which the wire rope extends and detect magnetic flux of the wire rope; and
a processing unit configured to acquire and process detection signals detected by the plurality of detection coils,
wherein the plurality of detection coils includes a first detection coil and a second detection coil, the first detection coil being provided along a circumference direction of the wire rope, the second detection coil being provided along the circumference direction of the wire rope and arranged to be inclined to the first detection coil when viewed from a direction perpendicular to a first direction along which the first detection coil moves relative to the wire rope, and
wherein the processing unit is configured to
identify an abnormality position of the wire rope in the first direction based on a detection signal detected by the first detection coil and
identify an area of the abnormality position of the wire rope in a cross-section of the identified abnormality position of the wire rope in the first direction, based on a detection signal detected by the second detection coil.

2. The wire rope inspection device as recited in claim 1,
wherein the first detection coil is configured to detect a detection signal having a peak corresponding to a detection position of the wire rope in the first direction,
wherein the second detection coil is configured to detect a detection signal having a peak corresponding to an area including a plurality of detection positions of the wire rope in a direction intersecting with the first direction, and
wherein the processing unit is configured to
identify the abnormality position of the wire rope in the first direction based on a detection time of a peak of a detection signal detected by the first detection coil and
identify the abnormality position of the wire rope in the cross-section of the identified abnormality position of the wire rope in the first direction based on a detection time of the peak of the detection signal detected by the second detection coil.

3. The wire rope inspection device as recited in claim 2,
wherein the processing unit is configured to identify the abnormality position of the wire rope in the cross-section of the identified abnormality position of the wire rope in the first direction, based on a magnitude of a deviation of a detection signal of the peak of the detection signal detected by the second detection coil to a detection time of the peak of the detection time detected by the first detection coil.

4. The wire rope inspection device as recited in claim 1,
wherein the second detection coil is arranged to be inclined to the first detection coil when viewed from an X-direction as a second direction perpendicular to a Z-direction as the first direction,
wherein the plurality of detection coils further includes a third detection coil provided along the circumferential direction of the wire rope and arranged to be inclined to the first detection coil when viewed from a Y-direction as a third direction perpendicular to the Z-direction and the X-direction, and
wherein the processing unit is configured to
identify the abnormality position of the wire rope in the Z-direction based on the detection signal detected by the first detection coil and
identify the abnormality position of the wire rope in the cross-section of the identified abnormality position of the wire rope in the first direction, based on detection signals detected by the second detection coil and the third detection coil.

5. The wire rope inspection device as recited in claim 4,
wherein the second detection coil is arranged to be inclined to the first detection coil and the third detection coil when viewed from the X-direction, and
wherein the third detection coil is arranged to be inclined to the first detection coil and the second detection coil when viewed from the Y-direction.

6. The wire rope inspection device as recited in claim 5,
wherein the first detection coil is configured to detect the detection signal having the peak corresponding to the detection position of the wire rope in the Z-direction,
wherein the second detection coil is configured to detect the detection signal having the peak corresponding to the area including the plurality of detection positions of the wire rope in the Y-direction,
wherein the third detection coil is configured to detect the detection signal having the peak corresponding to the area including the plurality of detection positions of the wire rope in the X-direction, and
wherein the processing unit is configured to
identify the position of the abnormality position of the wire rope in the Z-direction, based on the detection time of the peak of the detection signal detected by the first detection coil,
identify the position of the abnormality position of the wire rope in the Y-direction in the cross-section of the identified abnormality position of the wire rope, based on the detection time of the peak of the detection signal detected by the second detection coil, and
identify the position of the abnormality position of the wire rope in the X-direction in the cross-section of the identified abnormality position of the wire rope in the Z-direction, based on the detection time of the peak of the detection signal detected by the third detection coil.

7. The wire rope inspection device as recited in claim 4,
wherein the wire rope is composed of a plurality of wire ropes, and wherein the processing unit is configured to identify the abnormality position in the cross-section of each of the plurality of wire ropes in a direction intersecting with the Z-direction, based on peaks of detection signals detected by the first detection coil, the second detection coil, and the third detection coil.

8. The wire rope inspection device as recited in claim 7, wherein the first detection coil, the second detection coil, and the third detection coil are provided to each of the plurality of wire ropes.

9. The wire rope inspection device as recited in claim 8, wherein each of the first detection coil, the second detection coil, and the third detection coil includes a first portion arranged in a direction perpendicular to the Z-direction and a second portion arranged to sandwich the wire rope together with the first portion on a side opposite to a side where the first portion is arranged with respect to the wire rope.

10. The wire rope inspection device as recited in claim 1, further comprising:
an excitation unit configured to move relative to the wire rope and apply magnetic flux to the wire rope;
wherein the excitation unit is commonly provided to the plurality of detection coils.

11. The wire rope inspection device as recited in claim 10, further comprising:
a magnetic field application unit configured to apply a magnetic field in advance to the wire rope to adjust magnitude and direction of a magnetic field of the wire rope as a magnetic body,
wherein the excitation unit is configured to apply a magnetic field generated by causing an alternating current to flow through the wire rope.

12. A wire rope inspection system comprising:
a wire rope inspection device provided with a plurality of detection coils, the plurality of detection coils each being configured to move relative to the wire rope in a direction along which the wire rope extends and detect magnetic flux of the wire rope; and
a processing device configured to acquire and process detection signals detected by the plurality of detection coils,
wherein the plurality of detection coils includes a first detection coil and a second detection coil, the first detection coil being provided along a circumference direction of the wire rope, the second detection coil being provided along the circumference direction of the wire rope and arranged to be inclined to the first detection coil when viewed from a direction perpendicular to a first direction along which the first detection coil moves relative to the wire rope, and
wherein the processing device is configured to
identify an abnormality position of the wire rope in the first direction, based on the detection signal detected by the first detection coil, and
identify an area of the abnormality position of the wire rope in a cross-section of the acquired abnormality position of the wire rope in the first direction, based on a detection signal detected by the second detection coil.

13. The wire rope inspection device as recited in claim 1, wherein the processer is configured to:
identify an abnormality position of the wire rope in the first direction based on a detection time of the detection signal detected by the first detection coil, and
identify an area of the abnormality position of the wire rope in a cross-section of the identified abnormality position of the wire rope in the first direction based on a detection time of the detection signal detected by the second detection coil.

14. The wire rope inspection device as recited in claim 1, wherein the area of the abnormality position in the cross-section corresponds to a location of a particular cross-sectional area in the cross-section of the wire rope.

15. The wire rope inspection system as recited in claim 12, wherein the processer is configured to:
identify an abnormality position of the wire rope in the first direction based on a detection time of the detection signal detected by the first detection coil, and
identify an area of the abnormality position of the wire rope in a cross-section of the identified abnormality position of the wire rope in the first direction based on a detection time of the detection signal detected by the second detection coil.

16. The wire rope inspection system as recited in claim 12, wherein the area of the abnormality position of the wire rope in the cross-section corresponds to a location of a particular cross-sectional area in the cross-section of the wire rope.

* * * * *